(12) United States Patent
Kobashi

(10) Patent No.: US 12,007,594 B2
(45) Date of Patent: Jun. 11, 2024

(54) POLARIZATION CONVERSION ELEMENT

(71) Applicant: Japan Display Inc., Tokyo (JP)

(72) Inventor: Junji Kobashi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/465,199

(22) Filed: Sep. 12, 2023

(65) Prior Publication Data

US 2023/0417970 A1    Dec. 28, 2023

Related U.S. Application Data

(63) Continuation of application No. PCT/JP2022/001523, filed on Jan. 18, 2022.

(30) Foreign Application Priority Data

Mar. 12, 2021  (JP) ................. 2021-040521

(51) Int. Cl.
*G02B 5/30* (2006.01)
*G02B 5/18* (2006.01)
*G02F 1/1335* (2006.01)

(52) U.S. Cl.
CPC ........ *G02B 5/3016* (2013.01); *G02B 5/1814* (2013.01); *G02F 1/133536* (2013.01); *G02F 1/133607* (2021.01)

(58) Field of Classification Search
None
See application file for complete search history.

(56) References Cited

U.S. PATENT DOCUMENTS 9,341,855 B2   5/2016   Du et al.

*Primary Examiner* — Richard H Kim
(74) *Attorney, Agent, or Firm* — XSENSUS LLP

(57) ABSTRACT

According to one embodiment, a polarization conversion element includes a first light guide including a first main surface and a side surface, a transmissive first polarization grating opposed to the side surface, and a reflective second polarization grating opposed to the first main surface. The first polarization grating is configured to diffract first circularly polarized light of unpolarized incident light and to diffract second circularly polarized light which rotates in a direction opposite to the first circularly polarized light in a direction different from the first circularly polarized light. The second polarization grating is configured to reflect the first circularly polarized light on the reflective surface.

12 Claims, 15 Drawing Sheets

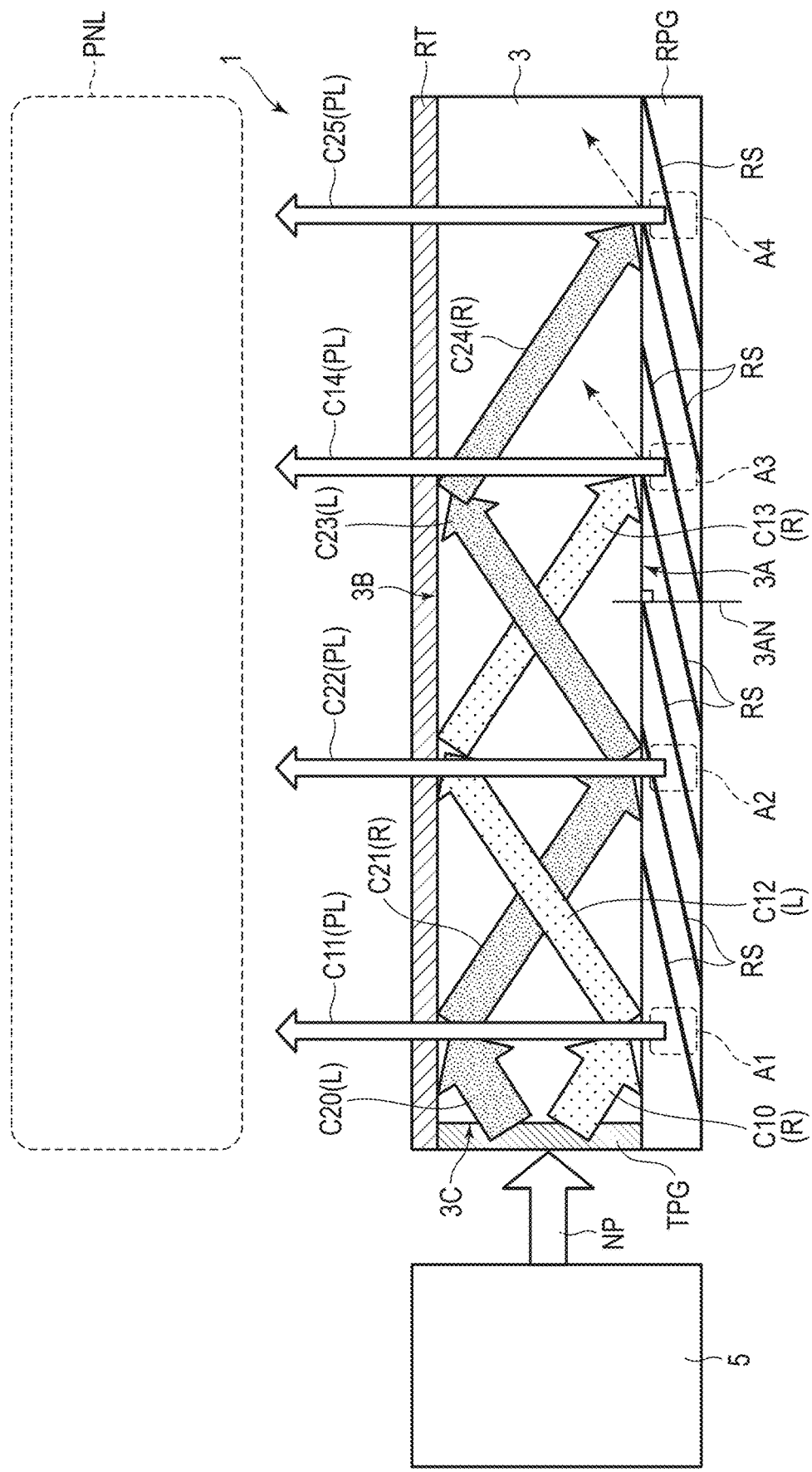
F I G. 9

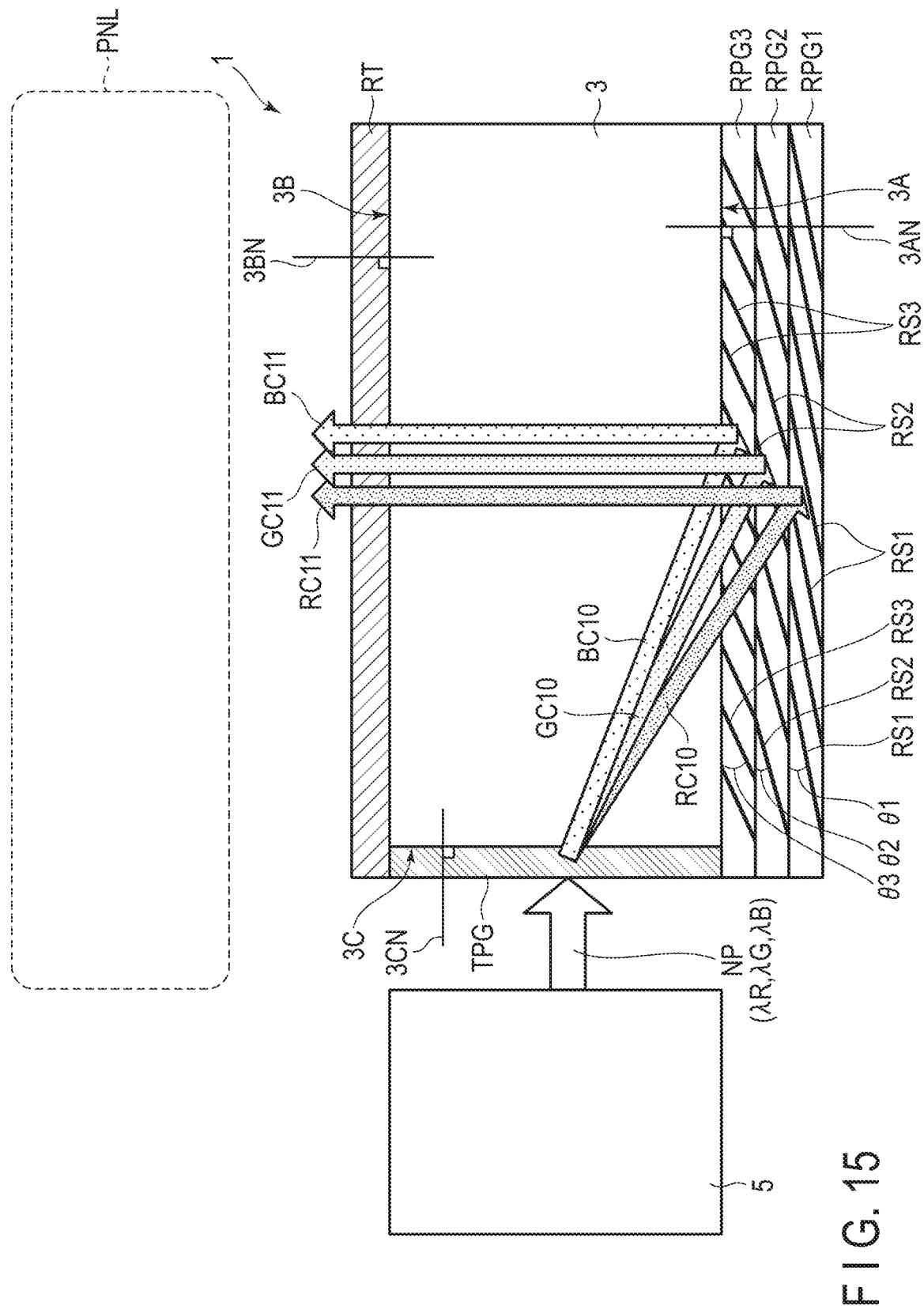
F I G. 15

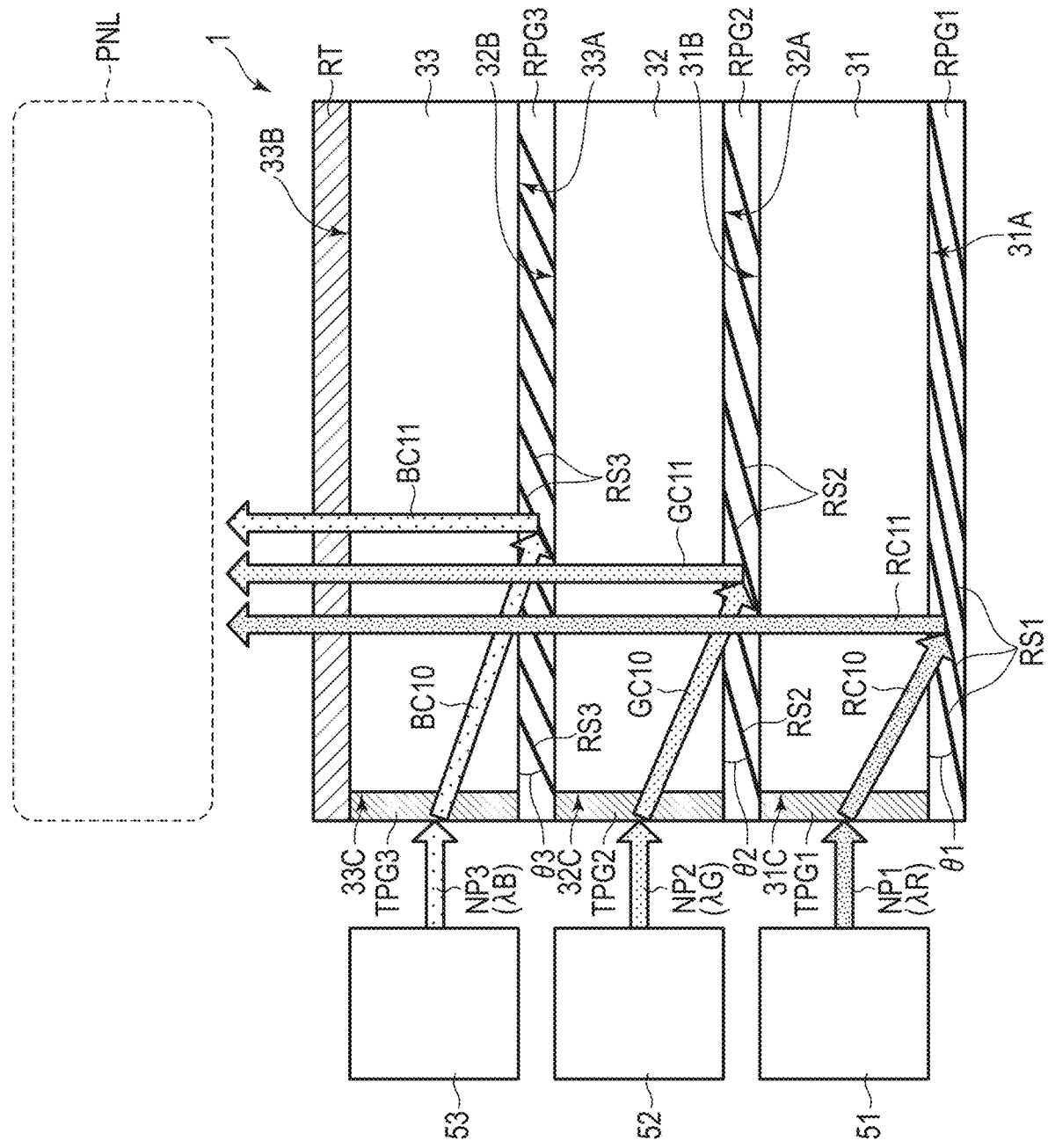
F I G. 16

POLARIZATION CONVERSION ELEMENT

CROSS-REFERENCE TO RELATED APPLICATIONS

This application is a Continuation Application of PCT Application No. PCT/JP2022/001523, filed Jan. 18, 2022 and based upon and claiming the benefit of priority from Japanese Patent Application No. 2021-040521, filed Mar. 12, 2021, the entire contents of all of which are incorporated herein by reference.

FIELD

Embodiments described herein relate generally to a polarization conversion element.

BACKGROUND

In recent years, polarization conversion elements that convert unpolarized light into predetermined circularly polarized light or linearly polarized light have been developed. As one example, a polarization conversion element in which a liquid crystal element containing liquid crystal molecules aligned in a predetermined pattern is applied as a transmissive polarization grating has been proposed. The polarization grating is configured to separate unpolarized light into right-handed circularly polarized light and left-handed circularly polarized light.

BRIEF DESCRIPTION OF THE DRAWINGS

FIG. 9 is a cross-sectional view showing yet another configuration example of the polarization conversion element 1.

FIG. 15 is a cross-sectional view showing yet another configuration example of the polarization conversion element 1.

FIG. 16 is a cross-sectional view showing yet another configuration example of the polarization conversion element 1.

DETAILED DESCRIPTION

Figure 1:
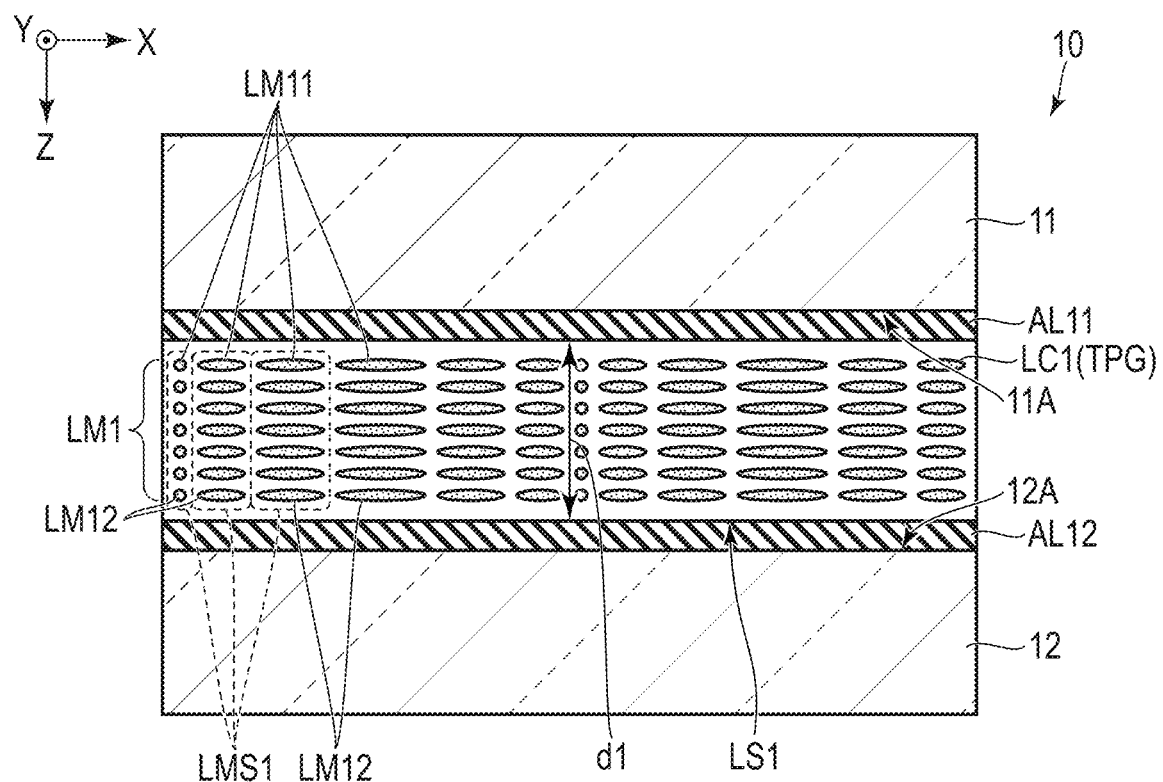
FIG. 1 is a cross-sectional view showing an example of a liquid crystal element 10 comprising a transmissive polarization grating TPG.

Embodiments described herein aim to provide a polarization conversion element capable of improving the efficiency of use of light.

In general, according to one embodiment, a polarization conversion element includes: a first light guide including a first main surface, a second main surface on a side opposite to the first main surface, and a side surface; a transmissive first polarization grating opposed to the side surface; and a reflective second polarization grating opposed to the first main surface. The first polarization grating contains nematic liquid crystal aligned along a normal direction of the side surface, and is configured to diffract first circularly polarized light of unpolarized incident light and to diffract second circularly polarized light in a direction different from the first circularly polarized light. The second circularly polarized light rotates in a direction opposite to the first circularly polarized light. The second polarization grating contains cholesteric liquid crystal forming a reflective surface inclined to the first main surface and is configured to reflect the first circularly polarized light on the reflective surface.

According to another embodiment, a polarization conversion element includes: a first light guide including a first main surface, a second main surface on a side opposite to the first main surface, and a side surface; a transmissive first polarization grating opposed to the side surface; and a transmissive second polarization grating opposed to the second main surface. The first polarization grating contains nematic liquid crystal aligned along a normal direction of the side surface and is configured to diffract first circularly polarized light of unpolarized incident light and to diffract second circularly polarized light in a direction different from the first circularly polarized light. The second circularly polarized light rotates in a direction opposite to the first circularly polarized light. The second polarization grating contains nematic liquid crystal aligned along a normal of the second main surface and is configured to diffract the first circularly polarized light and the second circularly polarized light.

According to the embodiments, a polarization conversion element capable of improving the efficiency of use of light can be provided.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis and a Z-axis orthogonal to each other are described to facilitate understanding as needed. A direction along the X-axis is referred to as an X-direction or a first direction, a direction along the Y-axis is referred to as a Y-direction or a second direction, and a direction along the Z-axis is referred to as a Z-direction or a third direction. A plane defined by the X-axis and the Y-axis is referred to as an X-Y plane. Viewing the X-Y plane is referred to as plan view. The first direction X and the second direction Y correspond to directions parallel to a main surface of a substrate included in the polarization conversion element, and the third direction Z corresponds to a thickness direction of the polarization conversion element.

First, a polarization grating applied to the polarization conversion element of the present embodiments will be described.

<<Transmissive Polarization Grating>>

FIG. 1 is a cross-sectional view showing an example of a liquid crystal element 10 comprising a transmissive polarization grating TPG.

The liquid crystal element 10 comprises a transparent substrate (first transparent substrate) 11, an alignment film AL11, a liquid crystal layer (first liquid crystal layer) LC1, an alignment film AL12, and a transparent substrate 12. The transparent substrate 11 is opposed to the transparent substrate 12 in the third direction Z. The liquid crystal layer LC1 functions as a polarization grating TPG and is located between the transparent substrate 11 and the transparent substrate 12.

The substrates 11 and 12 are composed of, for example, transparent glass plates or transparent synthetic resin plates. The transparent substrate 11 has an inner surface 11A. The transparent substrate 12 has an inner surface 12A. The inner surfaces 11A and 12A are surfaces parallel to the X-Y plane.

The alignment film AL11 is arranged on the inner surface 11A of the transparent substrate 11. The alignment film AL12 is arranged on the inner surface 12A of the transparent substrate 12. The alignment film AL12 is opposed to the alignment film AL11 in the third direction Z. The alignment films AL11 and AL12 are horizontal alignment films formed of, for example, polyimide and each having an alignment restriction force along the X-Y plane. In addition, in one example, the alignment films AL11 and AL12 are photo-alignment films for forming a spatially varying liquid crystal alignment pattern.

The liquid crystal layer LC1 is arranged between the alignment films AL11 and AL12 and is in contact with the alignment films AL11 and AL12. The liquid crystal layer LC1 has a main surface LS1. The main surface LS1 is, for example, a boundary between the liquid crystal layer LC1 and the alignment film AL12, and a surface parallel to the X-Y plane. The liquid crystal layer LC1 has a thickness d1 along the third direction Z. The liquid crystal layer LC1 contains nematic liquid crystal aligned along the third direction Z, which is a direction of the normal of the liquid crystal layer LC1. In one example, the nematic liquid crystal is aligned in the third direction Z as shown in the figure. In order to implement the same optical action for light in a wider wavelength range, the liquid crystal layer LC1 may be aligned such that the liquid crystal molecules LM11 arranged in the third direction Z are slightly twisted.

In other words, the liquid crystal layer LC1 includes a plurality of liquid crystal structures LMS1. When one liquid crystal structure LMS1 is focused, the liquid crystal structure LMS1 contains liquid crystal molecule LM11 located on one end side and liquid crystal molecule LM12 on the other end side. The liquid crystal molecule LM11 is close to the alignment film AL11, and the liquid crystal molecule LM12 is close to the alignment film AL12. The alignment direction of the liquid crystal molecule LM11 is substantially the same as the alignment direction of the liquid crystal molecule LM12. In addition, the alignment directions of the other liquid crystal molecules LM1 between the liquid crystal molecule LM11 and the liquid crystal molecule LM12 are also substantially the same as the alignment direction of the liquid crystal molecule LM11. In other words, the alignment directions of the liquid crystal molecules LM1 constituting one liquid crystal structure LMS1 are uniform in the third direction Z. The alignment directions of the liquid crystal molecules LM1 correspond to the long axes of the liquid crystal molecules in the X-Y plane.

In the liquid crystal layer LC1, the plurality of liquid crystal structures LMS1 are arranged in the first direction X and also arranged in the second direction Y. The plurality of liquid crystal structures LS1 adjacent in the first direction X have alignment directions different from each other. The alignment directions of a plurality of liquid crystal molecules LM11 close to the alignment film AL11, and the alignment directions of a plurality of liquid crystal molecules LM12 close to the alignment film AL12 are sequentially changed such that the long axes of the liquid crystal molecules rotate along the first direction X. In the liquid crystal layer LC1, the plurality of liquid crystal structures LMS1 adjacent in the second direction Y have alignment directions similar to each other.

Such a liquid crystal layer LC1 is cured in a state in which the alignment directions of the liquid crystal molecules LM1 containing the liquid crystal molecules LM11 and the liquid crystal molecules LM12 are fixed. In other words, the alignment directions of the liquid crystal molecules LM1 are not controlled depending on the electric field. For this reason, the liquid crystal element 10 does not comprise an electrode for controlling the alignment.

When the refractive anisotropy or birefringence (difference between a refractive index ne to extraordinary light and a refractive index no to ordinary light in the liquid crystal layer LC1) of the liquid crystal layer LC1 is referred to as $\Delta n$, retardation (phase difference) $\Delta n \cdot d1$ of the liquid crystal layer LC1 is desirably set to ½ of the specific wavelength (for example, green wavelength).

In the example shown in FIG. 1, the liquid crystal layer LC1 which functions as the polarization grating TPG is positioned between the pair of transparent substrates 11 and 12, but at least one of the transparent substrates 11 and 12 may be omitted and at least one of the alignment films AL11 and AL12 may be omitted.

In addition, the plurality of polarization gratings TPG may be stacked along the third direction Z.

<<Reflective Polarization Grating>>

Figure 2:
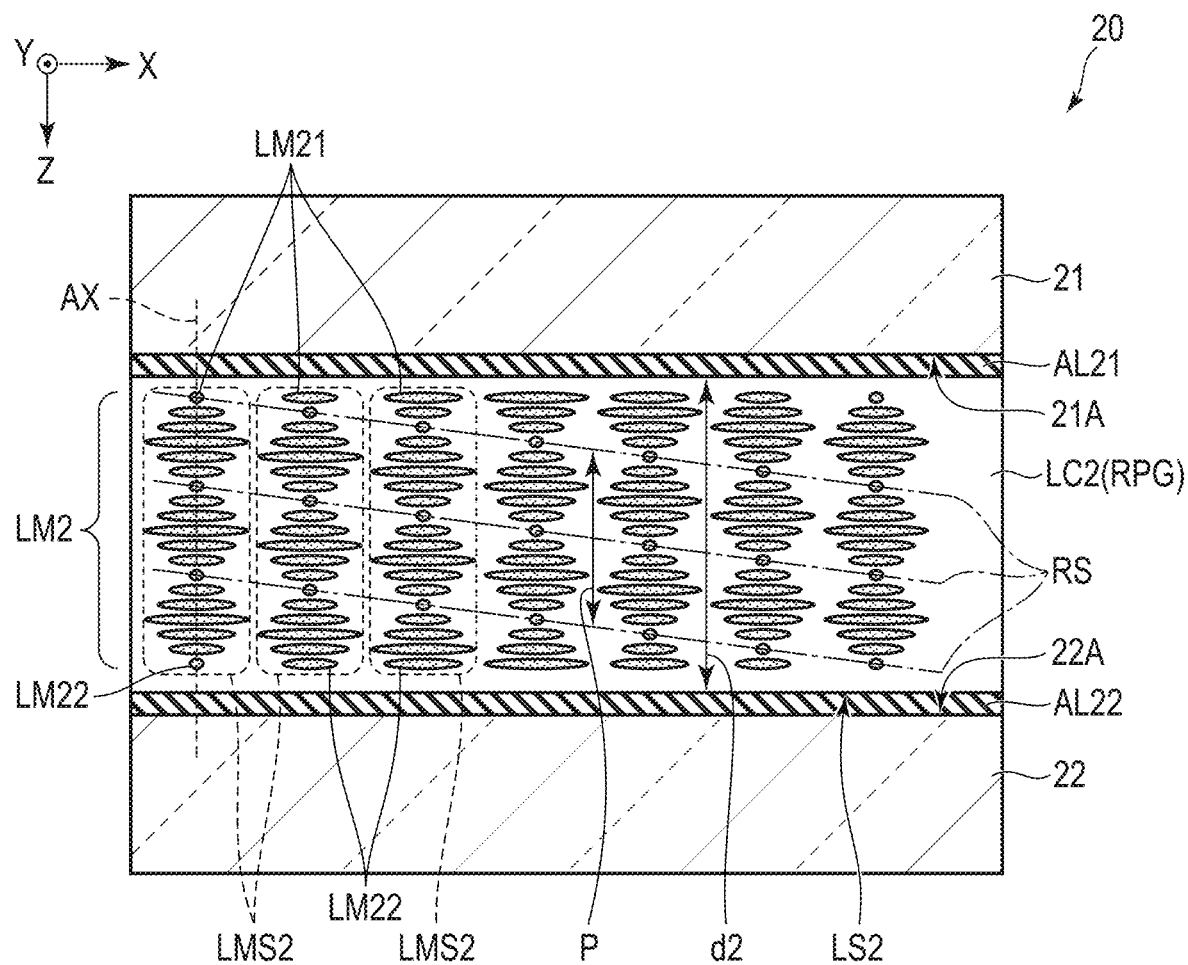
FIG. 2 is a cross-sectional view showing an example of a liquid crystal element 20 comprising a reflective polarization grating RPG.

FIG. 2 is a cross-sectional view showing an example of a liquid crystal element 20 comprising a reflective polarization grating RPG.

The liquid crystal element 20 comprises a transparent substrate (second transparent substrate) 21, an alignment film AL21, a liquid crystal layer (first liquid crystal layer) LC2, an alignment film AL22, and a transparent substrate 22. The transparent substrate 21 is opposed to the transparent substrate 22 in the third direction Z. The liquid crystal layer LC2 functions as a polarization grating RPG and is located between the transparent substrate 21 and the transparent substrate 22.

The substrates 21 and 22 are composed of, for example, transparent glass plates or transparent synthetic resin plates. The transparent substrate 21 has an inner surface 21A. The transparent substrate 22 has an inner surface 22A. The inner surfaces 21A and 22A are surfaces parallel to the X-Y plane.

The alignment film AL21 is arranged on the inner surface 21A of the transparent substrate 21. The alignment film AL22 is arranged on the inner surface 22A of the transparent substrate 22. The alignment film AL22 is opposed to the alignment film AL21 in the third direction Z. Each of the alignment films AL21 and AL22 is, for example, a horizontal alignment film which is formed of polyimide and each having an alignment restriction force along the X-Y plane. In addition, in one example, the alignment films AL21 and AL22 are photo-alignment films for forming a spatially varying liquid crystal alignment pattern.

The liquid crystal layer LC2 is arranged between the alignment films AL21 and AL22 and is in contact with the alignment films AL21 and AL22. The liquid crystal layer LC2 has a main surface LS2. The main surface LS2 is, for example, a boundary between the liquid crystal layer LC2 and the alignment film AL22, and a surface parallel to the X-Y plane. The liquid crystal layer LC2 has a thickness d2 along the third direction Z.

The liquid crystal layer LC2 contains cholesteric liquid crystal. In FIG. 2, one liquid crystal molecule LM2 of a plurality of liquid crystal molecules located in the same plane parallel to the X-Y plane is shown as the liquid crystal molecule LM2 that constitutes the cholesteric liquid crystal, for simple illustration, and the alignment direction of the liquid crystal molecule LM2 corresponds to an average alignment direction of the plurality of liquid crystal molecules located in the same plane.

In other words, the liquid crystal layer LC2 includes a plurality of liquid crystal structures LMS2. When one liquid crystal structure LMS2 is focused, the liquid crystal structure LMS2 contains liquid crystal molecule LM21 located on one end side and liquid crystal molecule LM22 on the other end side. The liquid crystal molecule LM21 is close to the alignment film AL21, and the liquid crystal molecule LM22 is close to the alignment film AL22. The plurality of liquid crystal molecules LM2 containing the liquid crystal molecule LM21 and the liquid crystal molecule LM22 are stacked in a spiral state while turning to construct the cholesteric liquid crystal. In other words, the liquid crystal structure LMS2 corresponds to the cholesteric liquid crystal. The liquid crystal structure LMS2 has a helical pitch P. The helical pitch P indicates one cycle of the helix (i.e., a thickness along a helical axis AX required for the liquid crystal molecules LM2 to rotate at 360 degrees). For example, the thickness d2 of the liquid crystal layer LC2 is several times or more as large as the helical pitch P. In the example shown in FIG. 2, the helical axis AX of the liquid crystal structure LMS2 is parallel to the third direction Z, which is a direction of the normal of the liquid crystal layer LC2.

In the liquid crystal layer LC2, the plurality of liquid crystal structures LMS2 are arranged in the first direction X and also arranged in the second direction Y. The plurality of liquid crystal structures LMS2 adjacent in the first direction X have alignment directions different from each other. The alignment directions of the plurality of liquid crystal molecules LM21 arranged along the alignment film AL21 and the alignment directions of the plurality of liquid crystal molecules LM22 arranged along the alignment film AL22 are changed continuously. In the liquid crystal layer LC2, the plurality of liquid crystal structures LMS2 adjacent along the second direction Y have alignment directions similar to each other.

The liquid crystal layer LC2 has a plurality of reflective surfaces RS as represented by one-dot chain lines, between the alignment film AL21 and the alignment film AL22. The plurality of reflective surfaces RS are substantially parallel to each other. The reflective surfaces RS reflect a part of the circularly polarized light of the incident light and transmit the other part of the circularly polarized light of the incident light, under the Bragg's law. The reflective surfaces RS correspond to planes where the alignment directions of the liquid crystal molecules LM2 are aligned or planes (equiphase wave surfaces) where the spatial phases are aligned. In the X-Z section shown in FIG. 2, the reflective surfaces RS are inclined to the main surface LS2 of the liquid crystal layer LC2.

The liquid crystal structure LMS2 reflects the circularly polarized light of the same turning direction as the turning direction of the cholesteric liquid crystal, of the light of the specific wavelength λ. For example, when the turning direction of the cholesteric liquid crystal is right-handed, the liquid crystal structure LMS2 reflects the right-handed circularly polarized light, of the light of the specific wavelength λ, and transmits the left-handed circularly polarized light. Similarly, when the turning direction of the cholesteric liquid crystal is left-handed, the liquid crystal structure LMS2 reflects the left-handed circularly polarized light, of the light of the specific wavelength λ, and transmits the right-handed circularly polarized light.

Such a liquid crystal layer LC2 is cured in a state in which the alignment directions of the liquid crystal molecules LM2 containing the liquid crystal molecules LM21 and the liquid crystal molecules LM22 are fixed. In other words, the alignment directions of the liquid crystal molecules LM2 are not controlled depending on the electric field. For this reason, the liquid crystal element 20 does not comprise an electrode for controlling the alignment.

In general, a selective reflection band ΔΔ of the cholesteric liquid crystal to the perpendicularly incident light is referred to as "no*P to ne*P", based on a helical pitch P of the cholesteric liquid crystal, a refractive index ne to extraordinary light, and refractive index no to ordinary light. For this reason, to effectively reflect the circularly polarized light of the specific wavelength λ on the reflective surfaces RS, the helical pitch P, and the refractive indexes ne and no are set such that the specific wavelength λ is included in the selective reflection wavelength range Δλ.

In the example shown in FIG. 2, the liquid crystal layer LC2 which functions as the polarization grating RPG is located between the pair of transparent substrates 21 and 22, but at least one of the transparent substrates 21 and 22 may be omitted and at least one of the alignment films AL21 and AL22 may be omitted.

In addition, the plurality of polarization gratings RPG may be stacked along the third direction Z.

Figure 3:
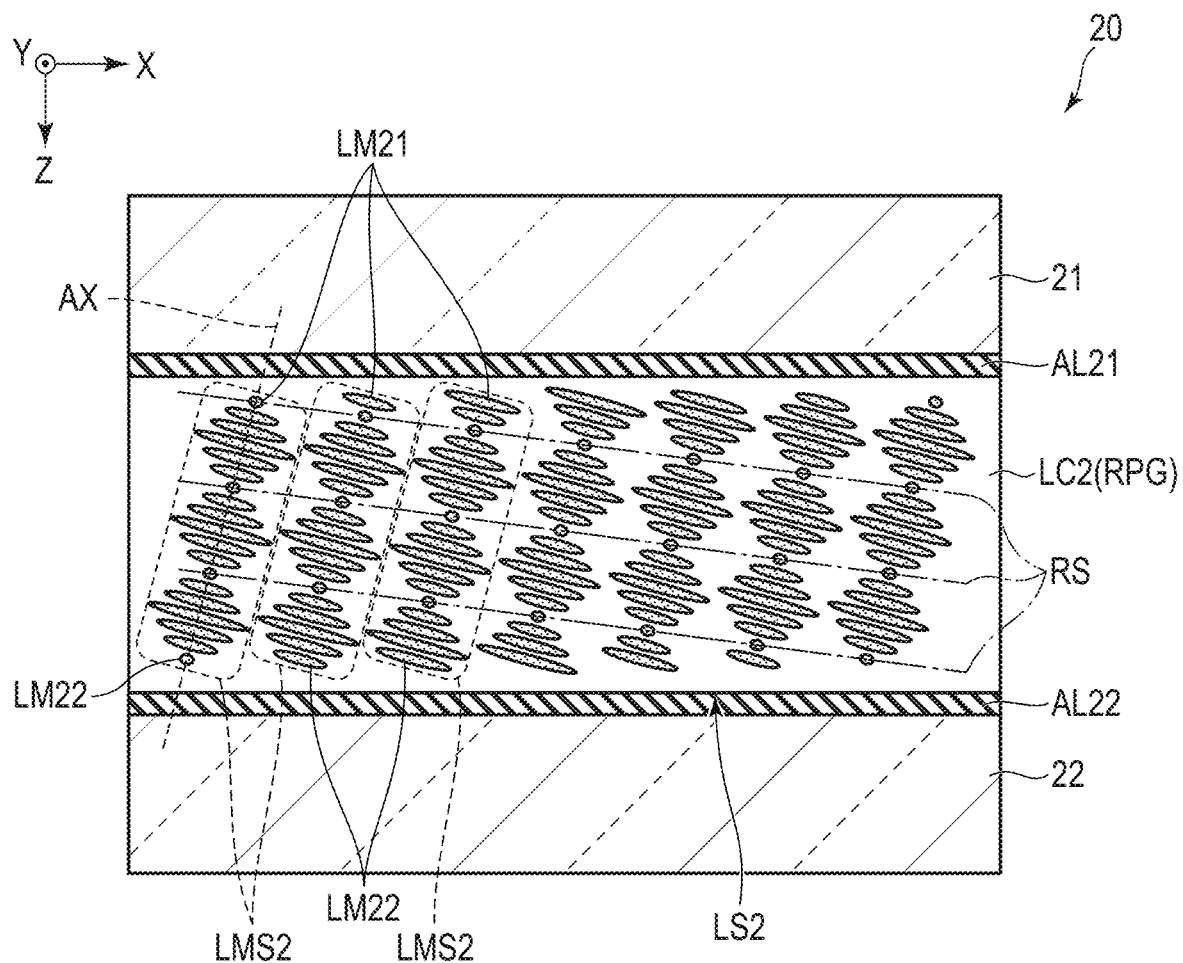
FIG. 3 is a cross-sectional view showing a modified example of the liquid crystal element 20.

FIG. 3 is a cross-sectional view showing a modified example of the liquid crystal element 20.

The modified example shown in FIG. 3 is different from the example shown in FIG. 2 in that the helical axes AX of the liquid crystal structures LMS2 are inclined to the normal (third direction Z) of the liquid crystal layer LC2.

In the liquid crystal layer LC2, the plurality of liquid crystal structures LMS2 adjacent in the first direction X have alignment directions different from each other. The alignment directions of the plurality of liquid crystal molecules LM21 arranged along the alignment film AL21 and the alignment directions of the plurality of liquid crystal molecules LM22 arranged along the alignment film AL22 are changed continuously.

The liquid crystal layer LC2 has a plurality of reflective surfaces RS as represented by one-dot chain lines, between the alignment film AL21 and the alignment film AL22. The plurality of reflective surfaces RS are substantially parallel to each other. The reflective surfaces RS reflect a part of the circularly polarized light of the incident light and transmit the other part of the circularly polarized light of the incident light, under the Bragg's law. In the X-Z section shown in FIG. 3, the reflective surfaces RS are inclined to the main surface LS2 of the liquid crystal layer LC2.

<<Optical Action>>

Figure 4:
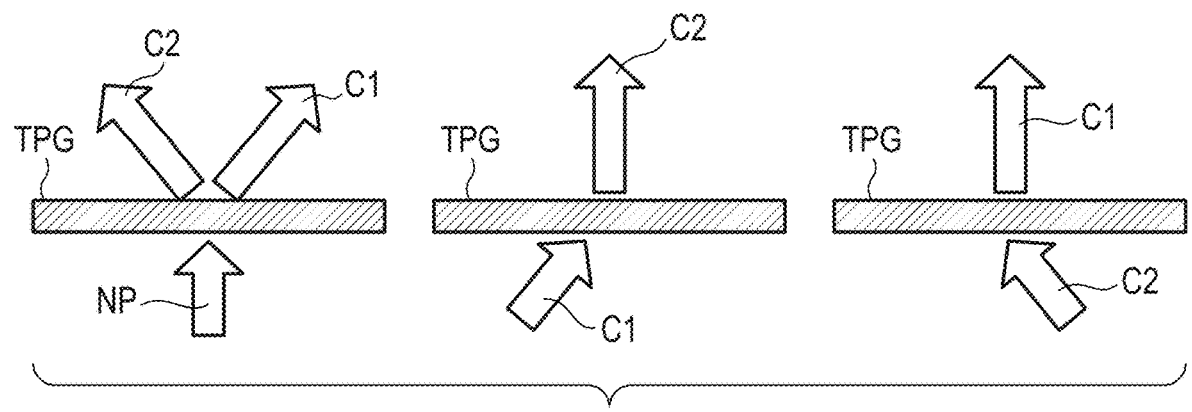
FIG. 4 is a diagram illustrating an optical action of the transmissive polarization grating TPG.

FIG. 4 is a diagram illustrating an optical action of the transmissive polarization grating TPG.

As shown on the left side of FIG. 4, when unpolarized light NP is made incident from the direction of the normal of the polarization grating TPG as incident light, the polarization grating TPG diffracts each of first circularly polarized light C1 and second circularly polarized light C2 of the light NP. The second circularly polarized light C2 is the circularly polarized light which turns oppositely to the first circularly polarized light C1. In addition, the second circularly polarized light C2 is diffracted in a direction different from the first circularly polarized light C1. In the example illustrated in the figure, the first circularly polarized light C1 is diffracted in a rightward oblique direction from the polarization grating TPG, and the second circularly polarized light C2 is diffracted in a leftward oblique direction from the polarization grating TPG.

In other words, when the unpolarized light NP is the incident light, the polarization grating TPG separates the light NP into the first circularly polarized light C1 and the second circularly polarized light C2.

As shown in the center of FIG. 4, when the first circularly polarized light C1 is made incident on the polarization grating TPG from an oblique direction as the incident light, the polarization grating TPG converts the first circularly polarized light C1 into the second circularly polarized light C2 and diffracts the light. In the example illustrated in the figure, the first circularly polarized light C1 made incident in the rightward oblique direction toward the polarization grating TPG is converted into the second circularly polarized light C2 and diffracted in the direction of the normal of the polarization grating TPG.

As shown on the right side of FIG. 4, when the second circularly polarized light C2 is made incident on the polarization grating TPG from an oblique direction as the incident light, the polarization grating TPG converts the second circularly polarized light C2 into the first circularly polarized light C1 and diffracts the light. In the example illustrated in the figure, the second circularly polarized light C2 made incident in the leftward oblique direction toward the polarization grating TPG is converted into the first circularly polarized light C1 and diffracted in the direction of the normal of the polarization grating TPG.

In other words, when the circularly polarized light is the incident light, the polarization grating TPG diffracts the transmitted light while converting the light into circularly polarized light turning in an opposite direction.

Figure 5:
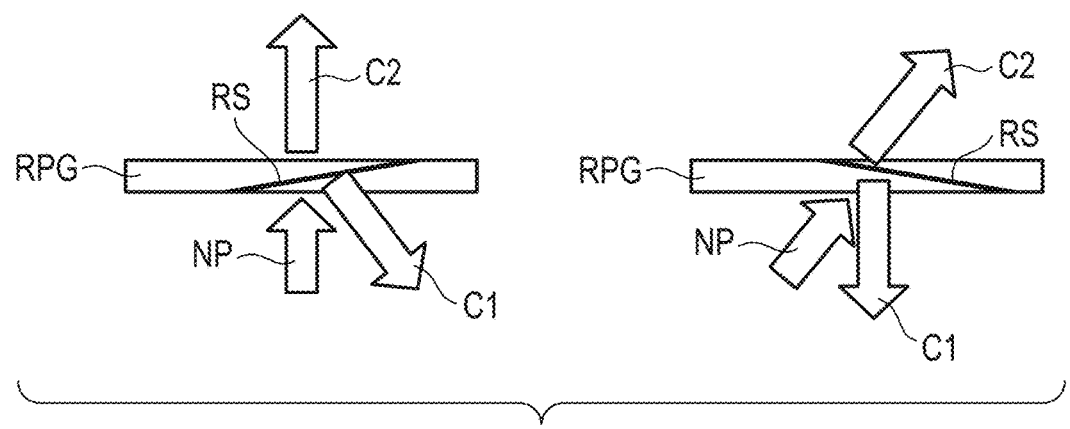
FIG. 5 is a diagram illustrating an optical action of the reflective polarization grating RPG.

FIG. 5 is a diagram illustrating an optical action of the reflective polarization grating RPG.

As shown on the left side of FIG. 5, when unpolarized light NP is made incident from the direction of the normal of the polarization grating RPG as the incident light, the polarization grating RPG reflects the first circularly polarized light C1 of the light NP on the reflective surface RS and transmits the second circularly polarized light C2. The first circularly polarized light C1 is obliquely reflected on the inclined reflective surface RS. The second circularly polarized light C2 passes through the reflective surface RS and travels straight along the normal of the polarization grating RPG.

As shown on the right side of FIG. 5, when unpolarized light NP is made incident on the polarization grating RPG from the oblique direction as the incident light, the polarization grating RPG also reflects the first circularly polarized light C1 of the light NP on the reflective surface RS and transmits the second circularly polarized light C2. The first circularly polarized light C1 is reflected on the inclined reflective surface RS along the normal. The second circularly polarized light C2 passes through the reflective surface RS and travels straight in an oblique direction with respect to the polarization grating RPG.

Several configuration examples of the polarization conversion element 1 will be described below. In each of the figures, the first circularly polarized light and the second circularly polarized light separated by the transmissive polarization grating TPG are referred to as C10 and C20, respectively, the circularly polarized light on the optical path of the first circularly polarized light C10 is referred to as C11, C12, C13, . . . , and the circularly polarized light on the optical path of the second circularly polarized light C20 is referred to as C21, C22, C23, . . . . In addition, the circularly polarized light described here may be strictly circularly polarized light or circularly polarized light similar to elliptically polarized light.

Configuration Example 1

Figure 6:
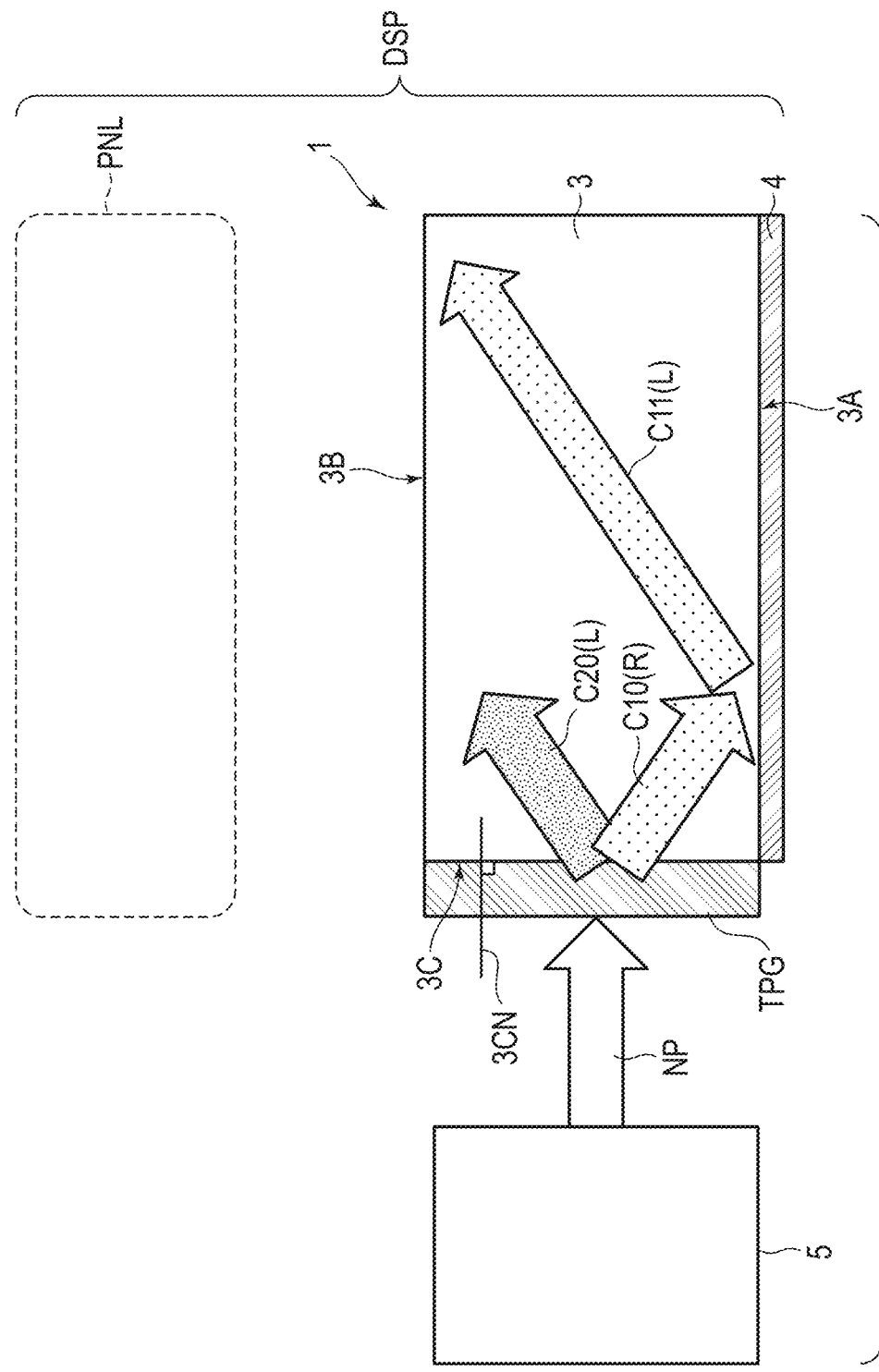
FIG. 6 is a cross-sectional view showing a configuration example of a polarization conversion element 1.

FIG. 6 is a cross-sectional view showing a configuration example of a polarization conversion element 1.

The polarization conversion element 1 comprises a light guide (first light guide) 3 and a transmissive polarization grating (first polarization grating) TPG.

The light guide 3 has a first main surface 3A, a second main surface 3B on a side opposite to the first main surface 3A, and a side surface 3C. The light guide 3 is composed of, for example, a transparent glass plate or transparent synthetic resin plate. The side surface 3C is a surface formed along a thickness direction of the light guide 3.

The polarization grating TPG is opposed to the side surface 3C. The polarization grating TPG corresponds to the liquid crystal layer LC1 of the liquid crystal element 10 shown in FIG. 1. However, the liquid crystal element 10 shown in FIG. 1 may be opposed to the side surface 3C and, in this case, the transparent substrate 11 is adhered to the side surface 3C. Alternatively, the transparent substrate 12 and the alignment film AL12 of the liquid crystal element 10 shown in FIG. 1 may be omitted, and the main surface LS1 of the liquid crystal layer LC1 may be adhered to the side surface 3C. In this case, the liquid crystal layer LC1 is arranged between the light guide 3 and the transparent substrate 11.

A normal 3CN of the side surface 3C corresponds to the third direction Z shown in FIG. 1. In other words, the polarization grating TPG contains nematic liquid crystals aligned along the normal 3CN of the side surface 3C. The plurality of liquid crystal molecules LM1 constituting the liquid crystal structure LMS1 shown in FIG. 1 are arranged along the normal 3CN, and the alignment directions of these liquid crystal molecules LM1 are uniform along the normal 3CN but may be slightly twisted as described above.

The first main surface 3A of the light guide 3 is in contact with a low refractive index medium having a lower refractive index than the light guide 3. The low refractive index medium is, for example, a thin film 4 but may be air. Alternatively, the thin film 4 may be a reflective layer formed of a material having a high reflectance. Such a first main surface 3A forms an interface that totally reflects light diffracted by the polarization grating TPG or the like, which will be described later.

A light source 5 is opposed to the polarization grating TPG. An optical system including various lenses may be arranged between the light source 5 and the polarization grating TPG. The light source 5 is configured to emit unpolarized light NP toward the polarization grating TPG.

The light NP emitted from the light source 5 is divided into first circularly polarized light C10 and second circularly polarized light C20 at the polarization grating TPG. For example, the first circularly polarized light C10 is right-handed circularly polarized light (R), and the second circularly polarized light C20 is left-handed circularly polarized light (L). The second circularly polarized light C20 is diffracted toward the second main surface 3B of the light guide 3 at the polarization grating TPG.

The first circularly polarized light C10 is diffracted toward the first main surface 3A of the light guide 3 at the polarization grating TPG. The first circularly polarized light C10 that has reached the first main surface 3A at an angle of incidence greater than or equal to a critical angle is totally reflected at the interface between the light guide 3 and the thin film 4. At this time, each of the s-polarized component and the p-polarized component included in the first circularly polarized light C10 generates phase shift. As a result, the totally reflected light C11 is converted into circularly polarized light whose rotation is opposite to the first circularly polarized light C10. In other words, the light C11 is left-handed circularly polarized light, similarly to the second circularly polarized light C20.

Such second circularly polarized light C20 and light C11 pass through the second main surface 3B and can form illumination light whose polarized states are substantially uniform. In other words, according to the polarization conversion element 1 described here, the unpolarized light NP emitted from the light source 5 can be converted into light (circularly polarized light) whose polarized states are substantially uniform with almost no loss, and the light utilization efficiency can be improved.

A display panel (for example, a liquid crystal panel) PNL, which is an example of an illumination target, is arranged to overlap the second main surface 3B as represented by a dotted line, and is illuminated by illumination light passing through the second main surface 3B. Thus, the polarization conversion element 1 can constitute an illumination device IL, together with the light source 5. Furthermore, the polarization conversion element 1, the light source 5, and the display panel PNL can constitute a display device DSP.

Configuration Example 2

Figure 7:
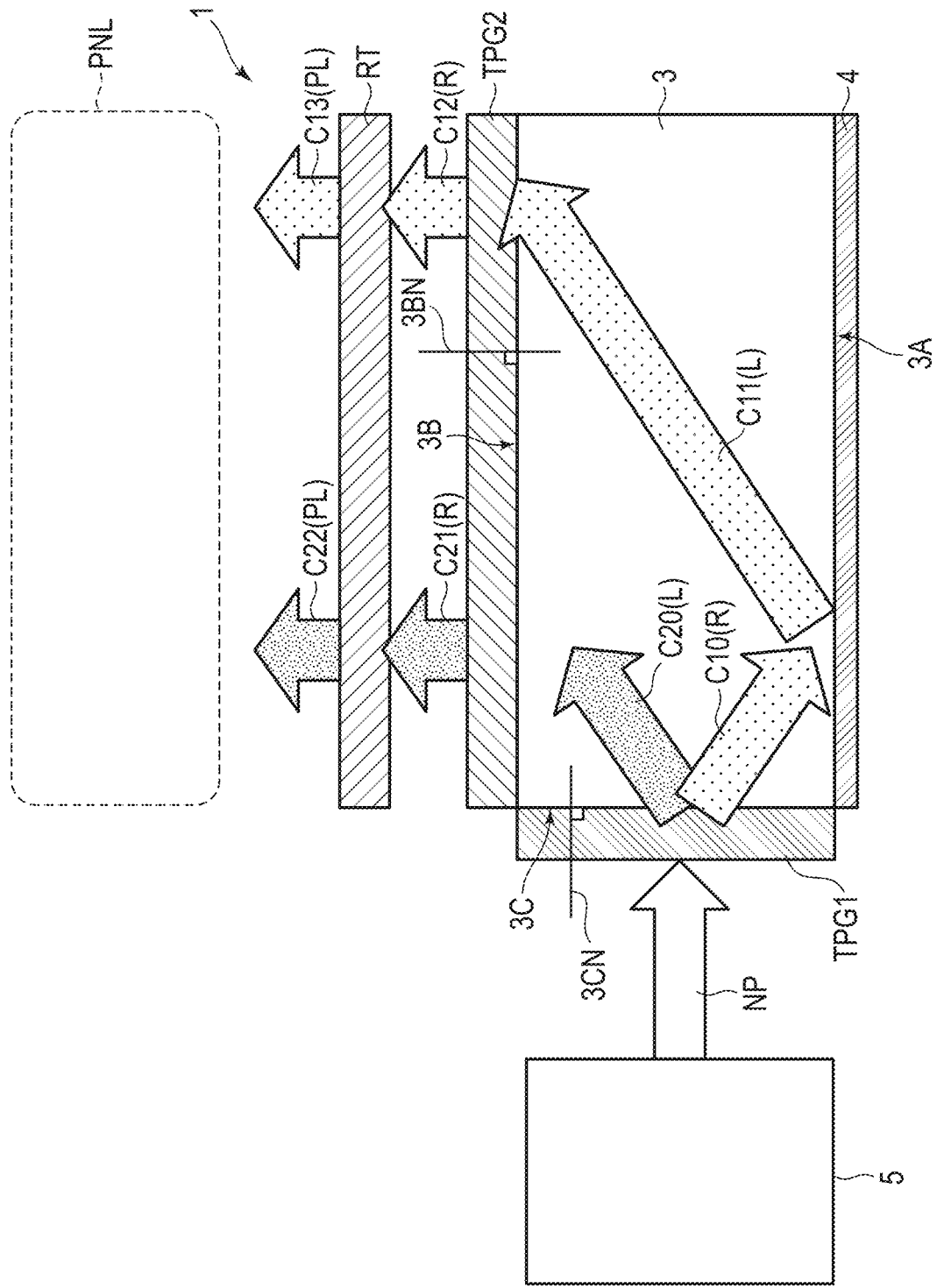
FIG. 7 is a cross-sectional view showing another configuration example of the polarization conversion element 1.

FIG. 7 is a cross-sectional view showing another configuration example of the polarization conversion element 1.

The example shown in FIG. 7 is different from the example shown in FIG. 6 in that the polarization conversion element 1 comprises a transmissive polarization grating (first polarization grating) TPG1, a transmissive polarization grating (second polarization grating) TPG2, and a retardation film RT. The polarization grating TPG1 opposed to the side surface 3C is the same as the polarization grating TPG shown in FIG. 6, and its description will be omitted.

The polarization grating TPG2 is opposed to the second main surface 3B. The polarization grating TPG2 corresponds to the liquid crystal layer LC1 of the liquid crystal element 10 shown in FIG. 1. However, the liquid crystal element 10 shown in FIG. 1 may be opposed to the second main surface 3B and, in this case, the transparent substrate 11 is adhered to the second main surface 3B. Alternatively, the transparent substrate 12 and the alignment film AL12 of the liquid crystal element 10 shown in FIG. 1 may be omitted, and the main surface LS1 of the liquid crystal layer LC1 may be adhered to the second main surface 3B. In this case, the liquid crystal layer LC1 is arranged between the light guide 3 and the transparent substrate 11.

A normal 3BN of the second main surface 3B corresponds to the third direction Z shown in FIG. 1. In other words, the polarization grating TPG2 contains nematic liquid crystals aligned along the normal 3BN of the second main surface 3B. The plurality of liquid crystal molecules LM1 constituting the liquid crystal structure LMS1 shown in FIG. 1 are arranged along the normal 3BN, and the alignment directions of these liquid crystal molecules LM1 are uniform along the normal 3BN but may be slightly twisted as described above. The polarization grating TPG2 may be configured to have a lens action of convergence or divergence by adjusting the phase distribution corresponding to the aligned states of the liquid crystal molecules.

The retardation film RT is opposed to the polarization grating TPG2. The retardation film RT may be adhered to the polarization grating TPG2 or an air layer may be interposed between the retardation film RT and the polarization grating TPG2. The retardation film RT is a quarter-wave plate, assigning a quarter-wave phase difference to the transmitted light.

The retardation film RT assigns a quarter-wave phase retardation to, for example, light having a specific wavelength, but is not limited to this example. For example, a wideband retardation film which also assigns a substantially quarter-wave phase difference to the light having each wavelength of the visible light range can be applied as the retardation film RT.

The light NP emitted from the light source 5 is divided into first circularly polarized light C10 and second circularly polarized light C20 at the polarization grating TPG1. For example, the first circularly polarized light C10 is right-handed circularly polarized light (R), and the second circularly polarized light C20 is left-handed circularly polarized light (L).

The first circularly polarized light C10 is diffracted toward the first main surface 3A of the light guide 3 at the polarization grating TPG1. The light C11 totally reflected on the first main surface 3A is converted into circularly polarized light whose rotation is opposite to the first circularly polarized light C10. In other words, the light C11 is left-handed circularly polarized light.

The light C11 is diffracted in a direction along the normal 3BN at the polarization grating TPG2 and is converted into circularly polarized light whose rotation is opposite to the light C11. In other words, the light C12 diffracted by the polarization grating TPG2 is right-handed circularly polarized light. The light C12 is converted into light C13, which is linearly polarized light (PL), on the retardation film RT.

The second circularly polarized light C20 is diffracted toward the second main surface 3B of the light guide 3 at the polarization grating TPG1. The second circularly polarized light C20 is diffracted in a direction along the normal 3BN at the polarization grating TPG2 and is converted into circularly polarized light whose rotation is opposite to the second circularly polarized light C20. In other words, the light C21 diffracted by the polarization grating TPG2 is right-handed circularly polarized light. The light C21 is converted into light C22, which is linearly polarized light (PL), on the retardation film RT.

Such light C12 and light C22 can form the illumination light of the linearly polarized light with substantially the same polarization axes. The display panel PNL which is an example of the illumination target is arranged to overlap the retardation film RT and is illuminated by the illumination light passing through the retardation film RT.

According to such a polarization conversion element 1, the unpolarized light NP emitted from the light source 5 can be converted into light (linearly polarized light) with substantially the same polarized states, and the efficiency of use of light can be improved.

Configuration Example 3

Figure 8:
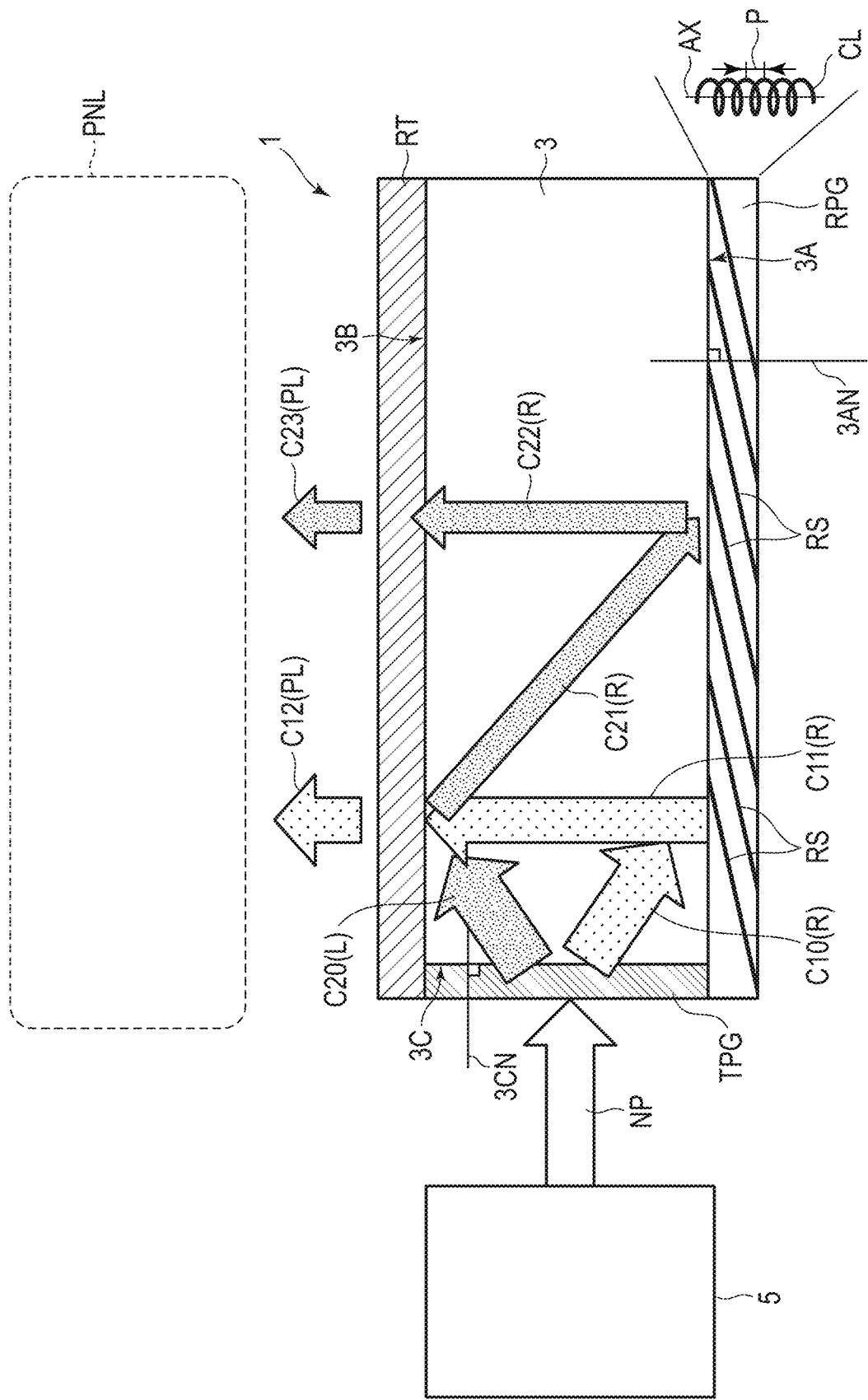
FIG. 8 is a cross-sectional view showing yet another configuration example of the polarization conversion element 1.

FIG. 8 is a cross-sectional view showing yet another configuration example of the polarization conversion element 1.

The example shown in FIG. 8 is different from the example shown in FIG. 6 in that the polarization conversion element 1 comprises a reflective polarization grating RPG and a retardation film RT in addition to the light guide 3 and the transmissive polarization grating TPG.

The polarization grating TPG is opposed to the side surface 3C. The polarization grating TPG corresponds to the liquid crystal layer LC1 of the liquid crystal element 10 shown in FIG. 1. However, the liquid crystal element 10 shown in FIG. 1 may be opposed to the side surface 3C and, in this case, the transparent substrate 11 is adhered to the side surface 3C. Alternatively, the transparent substrate 12 and the alignment film AL12 of the liquid crystal element 10 shown in FIG. 1 may be omitted, and the main surface LS1 of the liquid crystal layer LC1 may be adhered to the side surface 3C. In this case, the liquid crystal layer LC1 is arranged between the light guide 3 and the transparent substrate 11.

A normal 3CN of the side surface 3C corresponds to the third direction Z shown in FIG. 1. In other words, the polarization grating TPG contains nematic liquid crystals aligned along the normal 3CN of the side surface 3C. The plurality of liquid crystal molecules LM1 constituting the liquid crystal structure LMS1 shown in FIG. 1 are arranged along the normal 3CN, and the alignment directions of these liquid crystal molecules LM1 are uniform along the normal 3CN but may be slightly twisted as described above.

The polarization grating RPG is opposed to the first main surface 3A. The polarization grating RPG corresponds to, for example, the liquid crystal layer LC2 of the liquid crystal element 20 shown in FIG. 2. However, the liquid crystal element 20 shown in FIG. 2 may be opposed to the first main surface 3A and, in this case, the transparent substrate 21 is adhered to the first main surface 3A. Alternatively, the transparent substrate 22 and the alignment film AL22 of the liquid crystal element 20 shown in FIG. 2 may be omitted, and the main surface LS2 of the liquid crystal layer LC2 may be adhered to the first main surface 3A. In this case, the liquid crystal layer LC2 is arranged between the light guide 3 and the transparent substrate 21.

A normal 3AN of the first main surface 3A corresponds to the third direction Z shown in FIG. 2. In other words, the polarization grating RPG contains cholesteric liquid crystal CL, and a helical axis AX of the cholesteric liquid crystal CL is substantially parallel to the normal 3AN of the first main surface 3A. Alternatively, the when the polarization grating RPG is the liquid crystal layer LC2 of the liquid crystal element 20 shown in FIG. 3, the helical axis AX of the cholesteric liquid crystal CL is inclined to the normal 3AN. The polarization grating RPG has a reflective surface RS inclined to the first main surface 3A.

The cholesteric liquid crystal CL is schematically illustrated on the right side of the figure. For example, the cholesteric liquid crystal CL is rotated to reflect right-handed circularly polarized light of a specific wavelength λ and has a helical pitch P along the helical axis AX. In the cholesteric liquid crystal CL, the helical pitch P hardly changes and is constant along the helical axis AX.

The retardation film RT is opposed to the second main surface 3B. The retardation film RT may be adhered to the light guide 3 or an air layer may be interposed between the retardation film RT and the light guide 3. The retardation film RT is a quarter-wave plate, assigning a quarter-wave phase difference to the transmitted light.

The unpolarized light NP emitted from the light source 5 is divided into first circularly polarized light C10 and second circularly polarized light C20 at the polarization grating TPG. For example, the first circularly polarized light C10 is right-handed circularly polarized light (R), and the second circularly polarized light C20 is left-handed circularly polarized light (L).

The first circularly polarized light C10 is diffracted toward the first main surface 3A of the light guide 3 at the polarization grating TPG. The diffracted first circularly polarized light C10 passes through the first main surface 3A and is reflected on the reflective surface RS of the polarization grating RPG in a direction along the normal 3AN. The reflected light C11 is right-handed circularly polarized light, similarly to the first circularly polarized light C10. The light C11 passes through the second main surface 3B and is converted into light C12, which is linearly polarized light (PL), on the retardation film RT.

The second circularly polarized light C20 is diffracted toward the second main surface 3B of the light guide 3 at the polarization grating TPG. The second circularly polarized light C20 that has reached the second main surface 3B at an angle of incidence larger than a critical angle is totally reflected at the interface between the light guide 3 and the retardation film RT. The totally reflected light C21 is converted into circularly polarized light whose rotation is opposite to the second circularly polarized light C20. In other words, the light C21 is right-handed circularly polarized light.

The light C21 passes through the first main surface 3A and is reflected on the reflective surface RS of the polarization grating RPG in a direction along the normal 3AN. The reflected light C22 is right-handed circularly polarized light, similarly to the light C21. The light C22 passes through the second main surface 3B and is converted into light C23, which is linearly polarized light (PL), on the retardation film RT.

Such light C12 and light C23 can form the illumination light of the linearly polarized light with substantially the same polarization axes. The display panel PNL which is an example of the illumination target is arranged to overlap the retardation film RT and is illuminated by the illumination light passing through the retardation film RT.

According to such a polarization conversion element 1, the unpolarized light NP emitted from the light source 5 can be converted into light (linearly polarized light) with substantially the same polarized states, and the efficiency of use of light can be improved.

A light diffusion sheet, a prism sheet, a polarizer, and the like may be arranged between the retardation film RT and the display panel PNL.

Configuration Example 4

FIG. 9 is a cross-sectional view showing yet another configuration example of the polarization conversion element 1.

The example shown in FIG. 9 is different from the example shown in FIG. 8 in that the polarization grating RPG has a distribution of thickness.

In other words, the polarization grating RPG has a plurality of areas A1 to A4. The area A1 (first area) is located on a side close to the polarization grating TPG or the light source 5. The area A2 (second area) is located on a side far from the polarization grating TPG, and the area A1 is located between the polarization grating TPG and the area A2. The area A2 is located between the area A1 and the area A3, and the area A3 is located between the area A2 and the area A4. In other words, the areas A1 to A4 are arranged in order toward the side far from the polarization grating TPG. A relationship in thickness among these areas A1 to A4 will be described below.

Figure 10:
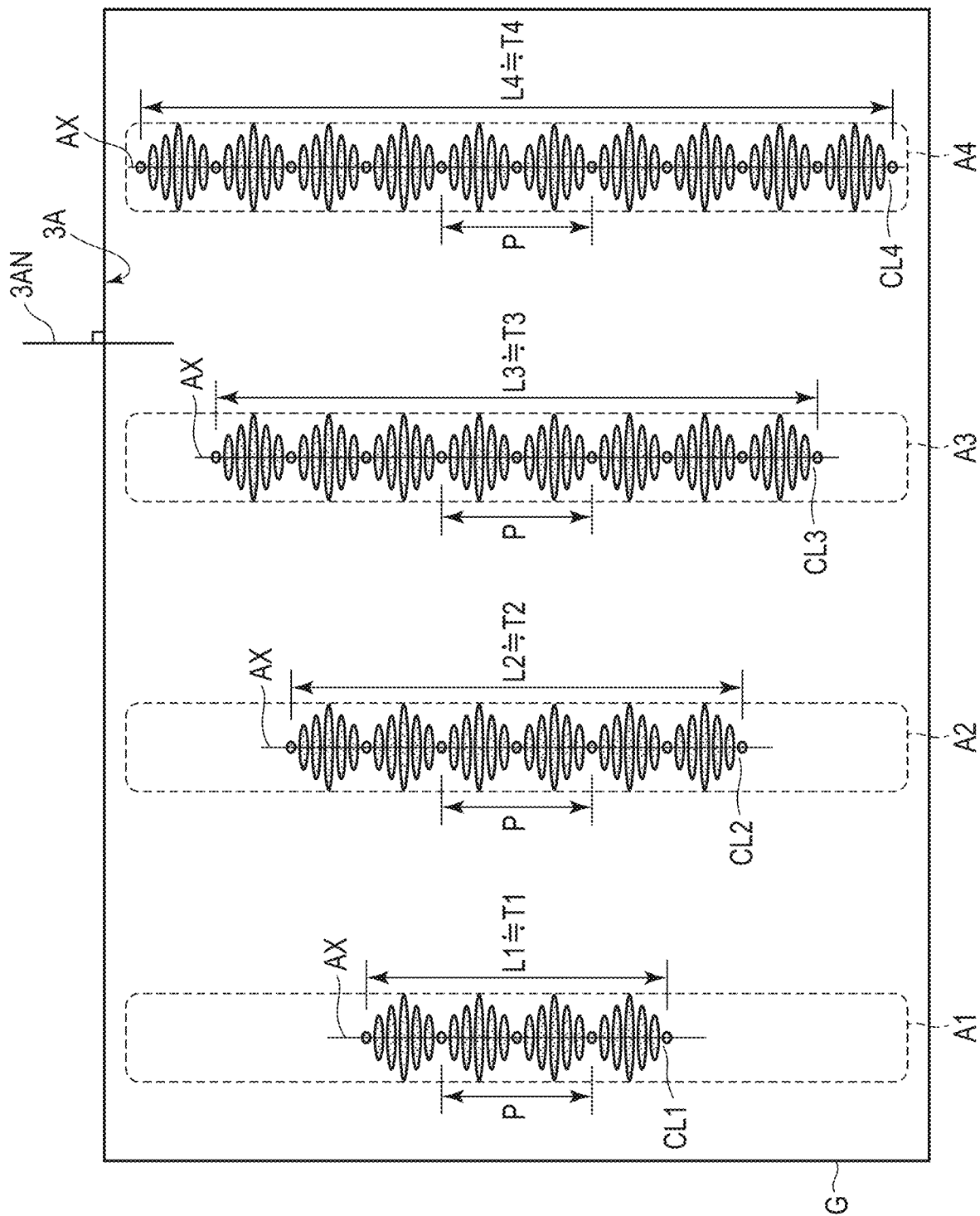
FIG. 10 is a view illustrating the areas A1 to A4 of the polarization grating RPG.

FIG. 10 is a view illustrating the areas A1 to A4 of the polarization grating RPG.

The area A1 is an area with cholesteric liquid crystal CL1 and has a thickness T1. The area A2 is an area with cholesteric liquid crystal CL2 and has a thickness T2. The area A3 is an area with cholesteric liquid crystal CL3 and has a thickness T3. The area A4 is an area with cholesteric liquid crystal CL4 and has a thickness T4. The thickness refers to, for example, a length along the normal 3AN, of the first main surface 3A with which the polarization grating RPG is in contact.

The thickness T1 of the area A1 is smaller than the thickness T2 of the area A2, the thickness T2 of the area A2 is smaller than the thickness T3 of the area A3, and the thickness T3 of the area A3 is smaller than the thickness T4 of the area A4 (T1<T2<T3<T4).

Each of the cholesteric liquid crystals CL1 to CL4 has the same helical pitch P. A length L1 along the helical axis AX of the cholesteric liquid crystal CL1 is substantially equal to the thickness T1, and is represented as P*N1. A length L2 of the cholesteric liquid crystal CL2 is substantially equal to the thickness T2, and is represented as P*N2. A length L3 of the cholesteric liquid crystal CL3 is substantially equal to the thickness T3, and is represented as P*N3. A length L4 of the cholesteric liquid crystal CL4 is substantially equal to the thickness T4, and is represented as P*N4. However, N1 to N4 are, for example, smaller than or equal to 10.

At this time, N1 is smaller than N2, N2 is smaller than N3, and N3 is smaller than N4 (N1<N2<N3<N4). Then, the length L1 is smaller than the length L2, the length L2 is smaller than the length L3, and the length L3 is smaller than the length L4 (L1<L2<L3<L4).

In the cholesteric liquid crystals, when the coefficients (N1 to N4) are in the range of, for example, 10 or less, the reflectance tends to be higher as the coefficients are larger. For this reason, the reflectance of the cholesteric liquid crystal CL2 in the area A2 is higher than the reflectance of the cholesteric liquid crystal CL1 in the area A1. Similarly, the reflectance in area A3 is higher than the reflectance in the area A2, and the reflectance in the area A4 is higher than the reflectance in the area A3.

The optical action of the polarization conversion element 1 will be described with reference to FIG. 9.

The unpolarized light NP emitted from the light source 5 is divided into first circularly polarized light C10 and second circularly polarized light C20 at the polarization grating TPG. For example, the first circularly polarized light C10 is right-handed circularly polarized light (R), and the second circularly polarized light C20 is left-handed circularly polarized light (L).

The first circularly polarized light C10 is diffracted toward the first main surface 3A of the light guide 3 at the polarization grating TPG. Part of the diffracted first circularly polarized light C10 is reflected in the direction along the normal 3AN on the reflective surface RS formed in the area A1 of the polarization grating RPG. The reflected light C11 is right-handed circularly polarized light similar to the first circularly polarized light C10, and is converted into linearly polarized light (PL) at the retardation film RT.

The other component of the diffracted first circularly polarized light C10 is totally reflected and is converted into circularly polarized light whose rotation is opposite to the first circularly polarized light C10. In other words, the totally reflected light C12 is left-handed circularly polarized light. The light C12 is totally reflected on the second main surface 3B and is converted into circularly polarized light whose rotation is opposite to the light C12. In other words, the totally reflected light C13 is right-handed circularly polarized light. Part of the light C13 is reflected in a direction along the normal 3AN on the reflective surface RS formed in the area A3 of the polarization grating RPG. The reflected light C14 is right-handed circularly polarized light and is converted into linearly polarized light (PL) at the retardation film RT.

The second circularly polarized light C20 is diffracted toward the second main surface 3B of the light guide 3 at the polarization grating TPG. The diffracted second circularly polarized light C20 is totally reflected on the second main surface 3B and is converted into circularly polarized light whose rotation is opposite to the second circularly polarized light C20. In other words, the totally reflected light C21 is right-handed circularly polarized light. Part of the light C21 is reflected in a direction along the normal 3AN on the reflective surface RS formed in the area A2 of the polarization grating RPG. The reflected light C22 is right-handed circularly polarized light and is converted into linearly polarized light (PL) at the retardation film RT.

The other component of the light C21 is totally reflected and is converted into circularly polarized light whose rotation is opposite to the light C21. In other words, the totally reflected light C23 is converted into left-handed circularly polarized light. The light C23 is totally reflected on the second main surface 3B and is converted into circularly polarized light whose rotation is opposite to the light C23. In other words, the totally reflected light C24 is right-handed circularly polarized light. Part of the light C24 is reflected in a direction along the normal 3AN on the reflective surface RS formed in the area A4 of the polarization grating RPG. The reflected light C25 is right-handed circularly polarized light and is converted into linearly polarized light (PL) at the retardation film RT.

According to such a polarization conversion element 1, in addition to the above effects, the difference in luminance distribution of the illumination light between the side close to the light source 5 and the side far from the light source 5 can be reduced.

Configuration Example 5

Figure 11:
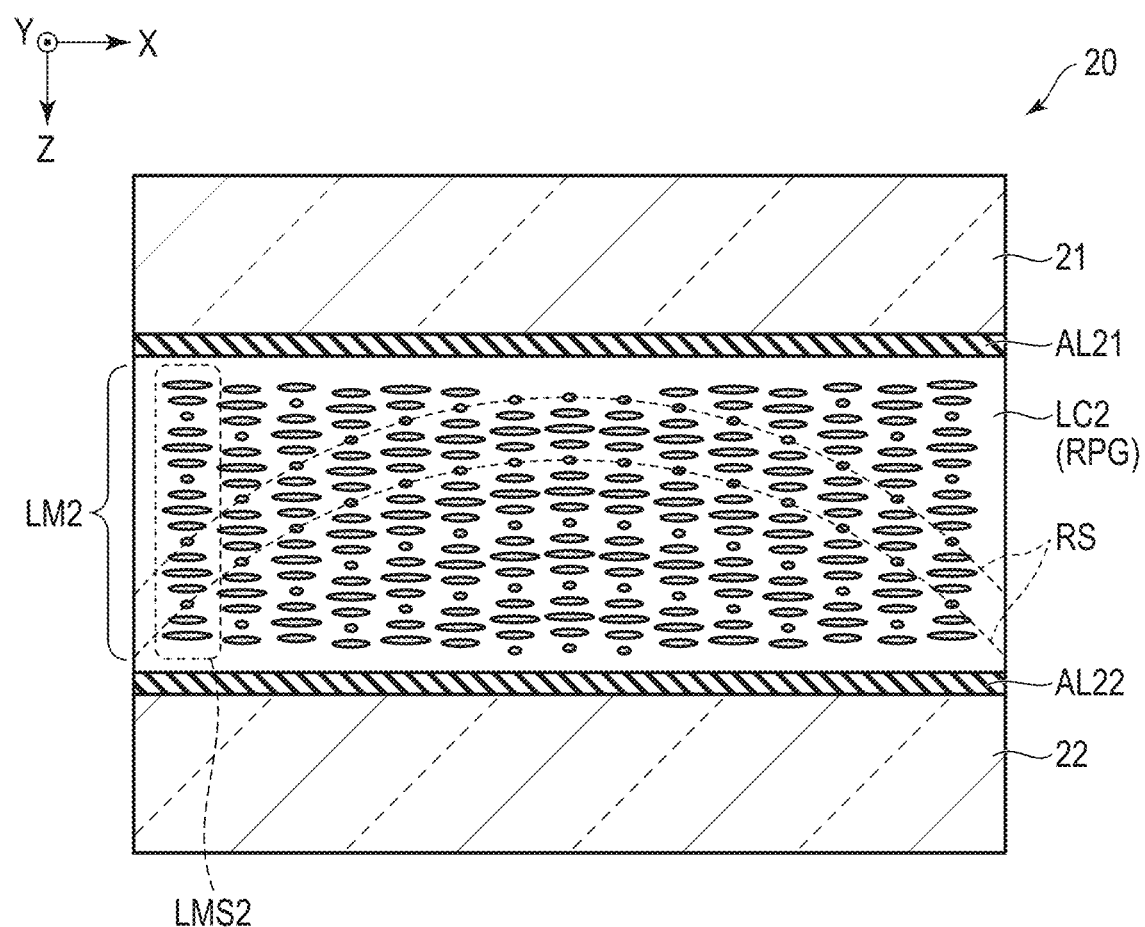
FIG. 11 is a cross-sectional view showing another example of the liquid crystal element 20 comprising the polarization grating RPG.

FIG. 11 is a cross-sectional view showing another example of the liquid crystal element 20 comprising the polarization grating RPG.

A liquid crystal layer LC2 corresponding to the polarization grating RPG includes a plurality of liquid crystal structures (cholesteric liquid crystal) LMS2. The plurality of liquid crystal molecules LM2 constituting the liquid crystal structures LMS2 are cured such that their alignment directions are fixed.

In addition, the liquid crystal layer LC2 has a plurality of reflective surfaces RS as represented by dotted lines, between the alignment film AL21 and the alignment film AL22. The reflective surface RS is a curved surface, concave on the side opposed to the transparent substrate 22, and convex on the side opposed to the transparent substrate 21. The reflective surface RS may be convex toward the side opposed to the transparent substrate 22.

Such a liquid crystal element 20 has a lens action of reflecting part of the circularly polarized light of the incident light and converging or diverging the light on the reflective surface RS.

Figure 12:
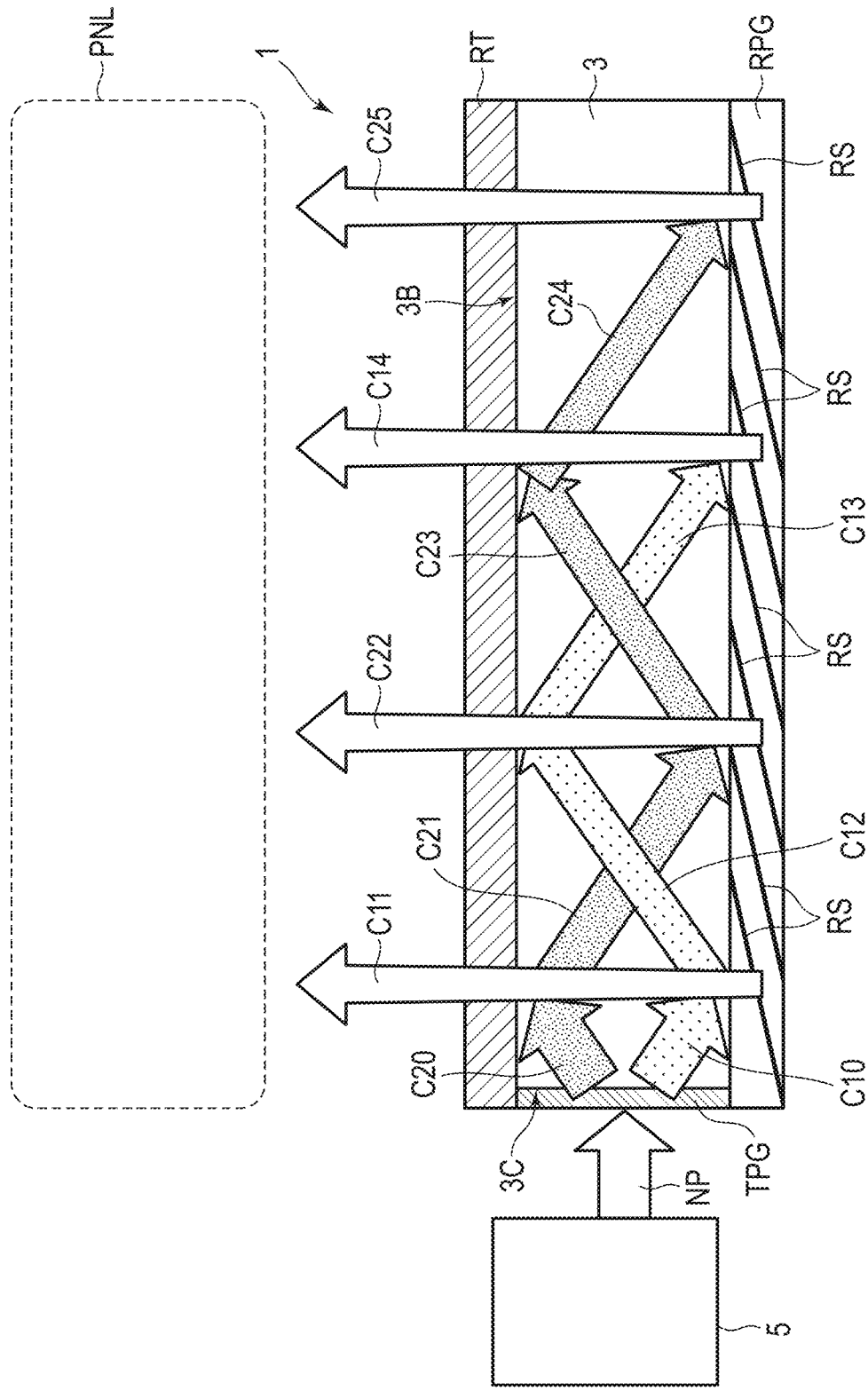
FIG. 12 is a cross-sectional view showing yet another configuration example of the polarization conversion element 1.

FIG. 12 is a cross-sectional view showing yet another configuration example of the polarization conversion element 1.

The example shown in FIG. 12 is different from the example shown in FIG. 9 in that the polarization conversion element 1 comprises the polarization grating RPG shown in FIG. 11. Description of each part will be omitted. In addition, the light on each optical path will be denoted by the same reference numerals as those in the example shown in FIG. 9, and their detailed description will be omitted.

Part of the first circularly polarized light C10 is reflected on the reflective surface RS of the polarization grating RPG and diverged under the lens action of the polarization grating RPG. Each of part of the light C13, part of the light C21, and part of the light C24, which are circularly polarized light similar to the first circularly polarized light C10, is reflected on the reflective surface RS and diverged. The circularly polarized light similar to the first circularly polarized light C10 can also be reflected and converged by changing the shape of the reflective surface RS.

Configuration Example 6

Figure 13:
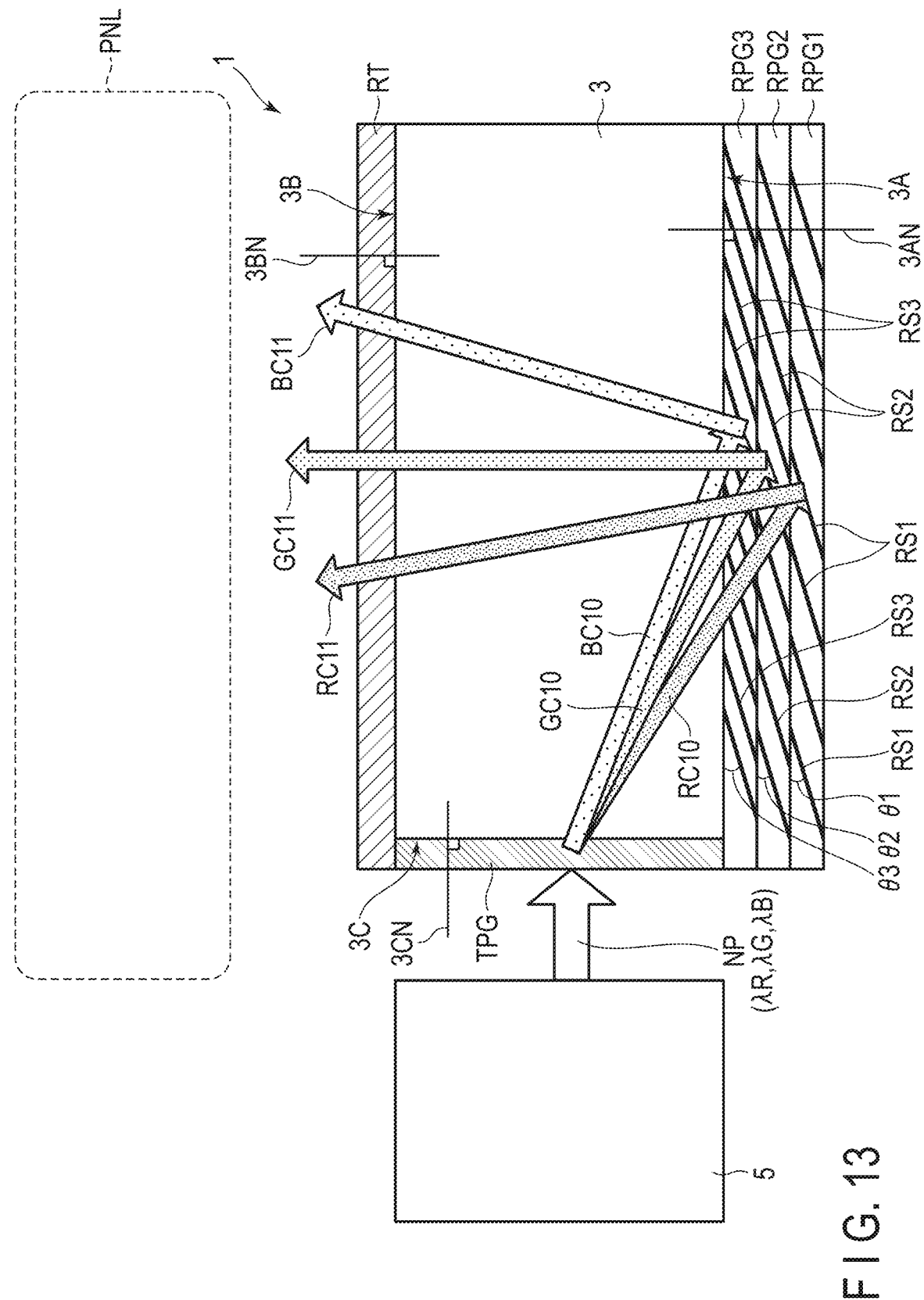
FIG. 13 is a cross-sectional view showing yet another configuration example of the polarization conversion element 1.

FIG. 13 is a cross-sectional view showing yet another configuration example of the polarization conversion element 1.

The example shown in FIG. 13 is different from the example shown in FIG. 8 in that the polarization conversion element 1 comprises a plurality of reflective polarization gratings RPG1, RPG2, and RPG3 in addition to the transmissive polarization grating (first polarization grating) TPG. The polarization grating (second polarization grating) RPG1 has a reflective surface RS1, the polarization grating (third polarization grating) RPG2 has a reflective surface RS2, and the polarization grating RPG3 has a reflective surface RS3. Inclination angles θ1 to θ3 of the respective reflective surfaces RS1 to RS3 with respect to the plane parallel to the first main surface 3A are substantially the same.

The polarization grating RPG2 is opposed to the polarization grating RPG1 and is arranged between the polarization grating RPG1 and the light guide 3. The polarization grating RPG3 is opposed to the polarization grating RPG2 and is arranged between the polarization grating RPG2 and the light guide 3. The polarization grating RPG3 is in contact with the first main surface 3A.

The polarization grating RPG1, the polarization grating RPG2, and the polarization grating RPG3 are stacked along the normal 3AN. The stacking order of the polarization grating RPG1, the polarization grating RPG2, and the polarization grating RPG3 is not limited to the example illustrated in the figure. The polarization grating RPG1, the polarization grating RPG2, and the polarization grating RPG3 are equivalent to the liquid crystal element 20 described with reference to FIG. 2, FIG. 3, and the like.

However, the helical pitches of the respective polarization grating RPG1, polarization grating RPG2, and polarization grating RPG3 are different from each other. This point will be described below.

Figure 14:
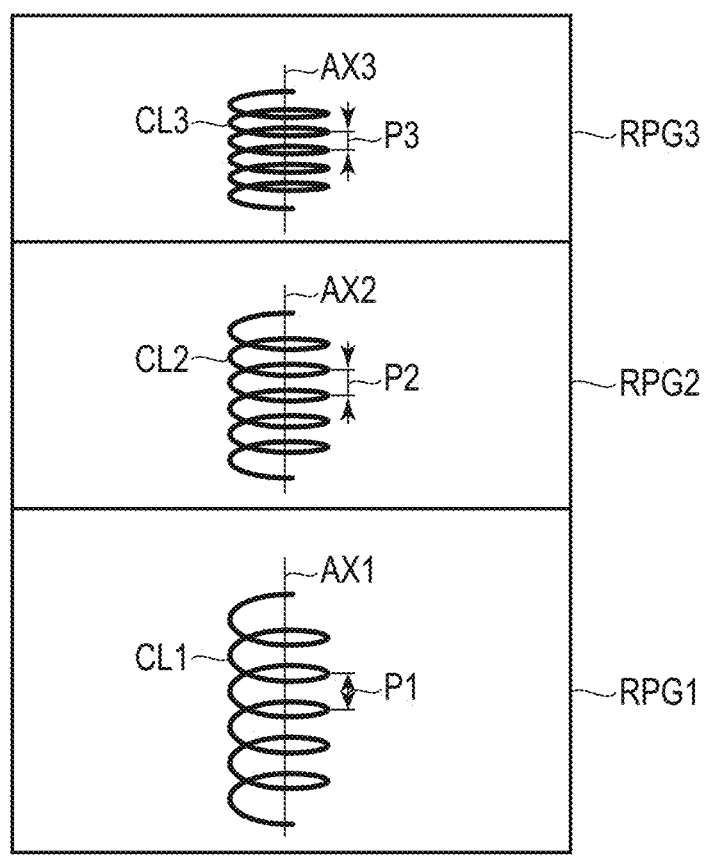
FIG. 14 is a diagram schematically polarization gratings RPG1 to RPG3.

FIG. 14 is a diagram schematically polarization gratings RPG1 to RPG3.

The polarization grating RPG1 is configured to reflect the first circularly polarized light of the red wavelength. The cholesteric liquid crystal CL1 contained in the polarization grating RPG1 has a helical pitch P1 along a helical axis AX1. The helical pitch P1 is optimized to correspond to the red wavelength. Such cholesteric liquid crystal CL1 forms the reflective surface RS1 shown in FIG. 13.

The polarization grating RPG2 is configured to reflect the first circularly polarized light of the green wavelength. In other words, the turning direction of the cholesteric liquid crystal CL2 contained in the polarization grating RPG2 is the same as the turning direction of the cholesteric liquid crystal CL1. In addition, the helical axis AX2 of the cholesteric liquid crystal CL2 is substantially parallel to the helical axis AX1 of the cholesteric liquid crystal CL1. The cholesteric liquid crystal CL2 has a helical pitch P2 along a helical axis AX2. The helical pitch P2 is smaller than the helical pitch P1 (P2<P1). The helical pitch P2 is optimized to correspond to the green wavelength. Such cholesteric liquid crystal CL2 forms the reflective surface RS2 shown in FIG. 13.

The polarization grating RPG3 is configured to reflect the first circularly polarized light of the blue wavelength. In other words, the turning direction of the cholesteric liquid crystal CL3 contained in the polarization grating RPG3 is the same as the turning direction of the cholesteric liquid crystal CL2. In addition, the helical axis AX3 of the cholesteric liquid crystal CL3 is substantially parallel to the helical axis AX2 of the cholesteric liquid crystal CL2. The cholesteric liquid crystal CL3 has a helical pitch P3 along a helical axis AX3. The helical pitch P3 is smaller than the helical pitch P2 (P3<P2). The helical pitch P3 is optimized to correspond to the blue wavelength. Such cholesteric liquid crystal CL3 forms the reflective surface RS3 shown in FIG. 13.

The optical action of the polarization conversion element 1 will be described again with reference to FIG. 13.

The light source 5 emits unpolarized light NP toward the polarization grating TPG. The light NP includes components of red wavelength (λR), green wavelength (λG), and blue wavelength (λB). The light NP is divided into the first circularly polarized light C10 and the second circularly polarized light C20 at the polarization grating TPG, and the only first circularly polarized light C10 diffracted toward the first main surface 3A is shown in the figure. The first circularly polarized light C10 is, for example, right-handed circularly polarized light.

The longer the wavelength, the larger the diffraction angle of the first circularly polarized light C10 diffracted by the polarization grating TPG to the normal 3CN. For this reason, the first circularly polarized light RC10 of the red wavelength is diffracted at a larger diffraction angle than the first circularly polarized light GC10 of the green wavelength. In addition, the first circularly polarized light GC10 of the green wavelength is diffracted at a larger diffraction angle than the first circularly polarized light BC10 of the blue wavelength.

The first circularly polarized light RC10 passes through the polarization gratings RPG3 and RPG2 and is reflected on the reflective surface RS1 of the polarization grating RPG1. The first circularly polarized light GC10 passes through the polarization grating RPG3 and is reflected on the reflective surface RS2 of the polarization grating RPG2. The first circularly polarized light BC10 is reflected on the reflective surface RS3 of the polarization grating RPG3.

As described above, since the inclination angles θ1 to θ3 of the respective reflective surfaces RS1 to RS3 are substantially the same, the light RC11 reflected on the reflective surface RS1, the light GC11 reflected on the reflective surface RS2, and the light BC11 reflected on the reflective surface RS3 passes through the second main surface 3B at different angles with respect to the normal 3BN of the second main surface 3B.

Each of the light RC11, light GC11, and light BC11 is right-handed circularly polarized light similar to the first circularly polarized light, and is converted into linearly polarized light (PL) at the retardation film RT.

Configuration Example 7

FIG. 15 is a cross-sectional view showing yet another configuration example of the polarization conversion element 1.

The example shown in FIG. 15 is different from the example shown in FIG. 13 in that the inclination angles θ1 to θ3 of the respective reflective surfaces RS1 to RS3 are different from each other. The inclination angle θ1 of the reflective surface RS1 is smaller than the inclination angle θ2 of the reflective surface RS2 (θ1<θ2). The inclination angle θ2 of the reflective surface RS2 is smaller than the inclination angle θ3 of the reflective surface RS3 (θ2<θ3).

The cholesteric liquid crystal CL1 contained in the polarization grating RPG1, the cholesteric liquid crystal CL2 contained in the polarization grating RPG2, and the cholesteric liquid crystal CL3 contained in the polarization grating RPG3 have been described with reference to FIG. 14.

The unpolarized light NP emitted from the light source 5 is divided into the first circularly polarized light C10 and the second circularly polarized light C20 at the polarization grating TPG, and the only first circularly polarized light C10 diffracted toward the first main surface 3A is shown in the figure. The first circularly polarized light C10 is, for example, right-handed circularly polarized light.

The first circularly polarized light RC10 of the red wavelength is reflected on the reflective surface RS1 of the polarization grating RPG1. The first circularly polarized light GC10 of the green wavelength is reflected on the reflective surface RS2 of the polarization grating RPG2. The first circularly polarized light BC10 of the blue wavelength is reflected on the reflective surface RS3 of the polarization grating RPG3.

The inclination angles θ1 to θ3 of the respective reflective surfaces RS1 to RS3 are set to reflect the light RC11 reflected on the reflective surface RS1, the light GC11 reflected on the reflective surface RS2, and the light BC11 reflected on the reflective surface RS3 in substantially the same direction. In other words, each of the light RC11, the light GC11, and the light BC11 passes through the second main surface 3B at substantially the same angle with respect to the normal 3BN of the second main surface 3B.

Each of the light RC11, light GC11, and light BC11 is right-handed circularly polarized light similar to the first circularly polarized light, and is converted into linearly polarized light (PL) at the retardation film RT.

According to such a polarization conversion element 1, chromatic aberration can be reduced as compared to the example shown in FIG. 13. For this reason, illumination light with little color unevenness can be formed.

Configuration Example 8

FIG. 16 is a cross-sectional view showing yet another configuration example of the polarization conversion element 1.

The polarization conversion element 1 comprises light guides 31 to 33, the transmissive polarization gratings TPG1 to TPG3, the reflective polarization gratings RPG1 to RPG3, and the retardation film RT.

The polarization grating RPG1 has a reflective surface RS1 opposed to the first main surface 31A of the light guide 31 and inclined to the first main surface 31A at an inclination angle θ1.

The polarization grating RPG2 has a reflective surface RS2 opposed to the second main surface 31B of the light guide 31 and the first main surface 32A of the light guide 32 and inclined to the first main surface 31A at an inclination angle θ2.

The polarization grating RPG3 has a reflective surface RS3 opposed to the second main surface 32B of the light guide 32 and the first main surface 33A of the light guide 33 and inclined to the first main surface 31A at an inclination angle θ3. These inclination angles θ1 to θ3 are different from each other and are set as described with reference to FIG. 15.

The polarization grating TPG1 is opposed to the side surface 31C of the light guide 31, the polarization grating TPG2 is opposed to the side surface 32C of the light guide 32, and the polarization grating TPG3 is opposed to the side surface 33C of the light guide 33. A common polarization grating TPG may be arranged on the side surface 31C, the side surface 32C, and the side surface 33C. Each of the polarization gratings TPG1 to TPG3 divide the unpolarized light into the first circularly polarized light and the second circularly polarized light, and only the first circularly polarized light is illustrated and description of the second circularly polarized light is omitted.

The light source 51 is opposed to the polarization grating TPG1 and is configured to emit the unpolarized light NP1 of red wavelength (λR) toward the polarization grating TPG1.

The light source 52 is opposed to the polarization grating TPG2 and is configured to emit the unpolarized light NP2 of green wavelength (λG) toward the polarization grating TPG2.

The light source 53 is opposed to the polarization grating TPG3 and is configured to emit the unpolarized light NP3 of blue wavelength (λB) toward the polarization grating TPG3.

The first circularly polarized light RC10 of the light NP1 is diffracted toward the first main surface 31A by the polarization grating TPG1. The first circularly polarized light RC10 is reflected on the reflective surface RS1 of the polarization grating RPG1. The light RC11 reflected on the reflective surface RS1 passes through the polarization grating RPG2, the light guide 32, the polarization grating RPG3, and the light guide 33, and is converted into linearly polarized light at the retardation film RT.

The first circularly polarized light GC10 of the light NP2 is diffracted toward the first main surface 32A by the polarization grating TPG2. The first circularly polarized light GC10 is reflected on the reflective surface RS2 of the polarization grating RPG2. The light GC11 reflected on the reflective surface RS2 passes through the polarization grating RPG3 and the light guide 33, and is converted into linearly polarized light at the retardation film RT.

The first circularly polarized light BC10 of the light NP3 is diffracted toward the first main surface 33A by the polarization grating TPG3. The first circularly polarized light BC10 is reflected on the reflective surface RS3 of the polarization grating RPG3. The light BC11 reflected on the reflective surface RS3 is converted into linearly polarized light at the retardation film RT.

According to such a polarization conversion element 1, chromatic aberration can be reduced and illumination light with little color unevenness can be formed.

As described above, the polarization conversion element capable of improving the efficiency of use of light can be provided according to the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A polarization conversion element comprising:
   a first light guide including a first main surface, a second main surface on a side opposite to the first main surface, and a side surface;
   a transmissive first polarization grating opposed to the side surface; and
   a reflective second polarization grating opposed to the first main surface, wherein
   the first polarization grating contains nematic liquid crystal aligned along a normal direction of the side surface, and is configured to diffract first circularly polarized light of unpolarized incident light and to diffract second circularly polarized light which rotates in a direction opposite to the first circularly polarized light in a direction different from the first circularly polarized light, and
   the second polarization grating contains cholesteric liquid crystal forming a reflective surface inclined to the first main surface, and is configured to reflect the first circularly polarized light on the reflective surface.

2. The polarization conversion element of claim 1, further comprising:
   a retardation film opposed to the second main surface.

3. The polarization conversion element of claim 2, wherein
   the second polarization grating includes a first area containing first cholesteric liquid crystal and a second area containing second cholesteric liquid crystal,
   the first area is located between the first polarization grating and the second area,
   each of the first cholesteric liquid crystal and the second cholesteric liquid crystal has a same helical pitch, and
   a thickness of the first area is smaller than a thickness of the second area.

4. The polarization conversion element of claim 2, wherein
   the second polarization grating has a lens action of converging and diverging the first circularly polarized light.

5. The polarization conversion element of claim 1, wherein
   the second polarization grating includes a first area containing first cholesteric liquid crystal and a second area containing second cholesteric liquid crystal,
   the first area is located between the first polarization grating and the second area,
   each of the first cholesteric liquid crystal and the second cholesteric liquid crystal has a same helical pitch, and
   a thickness of the first area is smaller than a thickness of the second area.

6. The polarization conversion element of claim 1, wherein
   the second polarization grating has a lens action of converging and diverging the first circularly polarized light.

7. The polarization conversion element of claim 1, further comprising:
   a reflective third polarization grating opposed to the second polarization grating, wherein
   the third polarization grating contains cholesteric liquid crystal forming a reflective surface inclined to the first main surface, and
   a helical pitch of the cholesteric liquid crystal in the third polarization grating is different from a helical pitch of the cholesteric liquid crystal in the second polarization grating.

8. The polarization conversion element of claim 7, wherein
   an inclination angle of the reflective surface in the third polarization grating is different from an inclination angle of the reflective surface in the second polarization grating.

9. The polarization conversion element of claim 1, further comprising:
   a reflective third polarization grating opposed to the second main surface; and
   a second light guide opposed to the third polarization grating, wherein
   the third polarization grating contains cholesteric liquid crystal forming a reflective surface inclined to the first main surface, and
   a helical pitch of the cholesteric liquid crystal in the third polarization grating is different from a helical pitch of the cholesteric liquid crystal in the second polarization grating.

10. The polarization conversion element of claim 9, wherein
    an inclination angle of the reflective surface in the third polarization grating is different from an inclination angle of the reflective surface in the second polarization grating.

11. A polarization conversion element comprising:
    a first light guide including a first main surface, a second main surface on a side opposite to the first main surface, and a side surface;
    a transmissive first polarization grating opposed to the side surface; and
    a transmissive second polarization grating opposed to the second main surface, wherein
    the first polarization grating contains nematic liquid crystal aligned along a normal direction of the side surface, and is configured to diffract first circularly polarized light of unpolarized incident light and to diffract second circularly polarized light which rotates in a direction opposite to the first circularly polarized light in a direction different from the first circularly polarized light, and the second polarization grating contains nematic liquid crystal aligned along a normal of the second main surface, and is configured to diffract the first circularly polarized light and the second circularly polarized light.

12. The polarization conversion element of claim 11, further comprising:

a retardation film opposed to the second polarization grating.

* * * * *